US009442289B2

(12) United States Patent
Nishima et al.

(10) Patent No.: US 9,442,289 B2
(45) Date of Patent: Sep. 13, 2016

(54) DISPLAY APPARATUS FOR VEHICLE

(71) Applicant: JVC KENWOOD Corporation, Yokohama-shi (JP)

(72) Inventors: Ryo Nishima, Yokohama (JP); Isao Kaneno, Yokohama (JP); Yuji Tanaka, Yokohama (JP); Tatsuya Sato, Yokohama (JP); Motoshi Tohda, Yokohama (JP); Tatsuya Mukouyama, Yokohama (JP); Kouichi Kawamura, Yokohama (JP); Kazutaka Aboshi, Yokohama (JP); Manabu Kobayashi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 74 days.

(21) Appl. No.: 14/579,880

(22) Filed: Dec. 22, 2014

(65) Prior Publication Data

US 2015/0103408 A1 Apr. 16, 2015

Related U.S. Application Data

(63) Continuation of application No. PCT/JP2013/003571, filed on Jun. 6, 2013.

(30) Foreign Application Priority Data

| Jun. 29, 2012 | (JP) | 2012-147991 |
| Jun. 29, 2012 | (JP) | 2012-148006 |
| Jun. 29, 2012 | (JP) | 2012-148022 |
| Jun. 29, 2012 | (JP) | 2012-148023 |
| Jun. 29, 2012 | (JP) | 2012-148024 |
| Jun. 29, 2012 | (JP) | 2012-148025 |
| Jun. 29, 2012 | (JP) | 2012-148033 |
| Jun. 29, 2012 | (JP) | 2012-148034 |
| Jun. 29, 2012 | (JP) | 2012-148035 |
| Jul. 20, 2012 | (JP) | 2012-161970 |

(51) Int. Cl.
*G02B 27/10* (2006.01)
*G02B 27/01* (2006.01)
*B60K 35/00* (2006.01)

(52) U.S. Cl.
CPC ........... *G02B 27/0149* (2013.01); *B60K 35/00* (2013.01); *G02B 27/0101* (2013.01);

(Continued)

(58) Field of Classification Search
CPC ..................................................... G02B 27/10
USPC ........................................................ 359/618
See application file for complete search history.

(56) References Cited

U.S. PATENT DOCUMENTS

| 3,824,535 A | 7/1974 | Rover, Jr. |
| 6,690,522 B2 * | 2/2004 | Kobayashi ............... G02B 5/04 359/631 |
| 2010/0026970 A1 * | 2/2010 | Tanaka ............... G02B 27/0176 353/81 |

FOREIGN PATENT DOCUMENTS

| JP | 63-072237 U | 5/1988 |
| JP | 03-139441 A | 6/1991 |

(Continued)

OTHER PUBLICATIONS

International Search Report, issued in PCT Application No. PCT/JP2013/003571, dated Jul. 9, 2013.

(Continued)

*Primary Examiner* — James Jones
(74) *Attorney, Agent, or Firm* — Venable LLP; Michael A. Sartori

(57) ABSTRACT

An display apparatus, for a vehicle, according to one embodiment includes a substrate housing portion, an optical unit, a turning member, and a plate-like attachment plate. The substrate housing portion contains a circuit substrate for outputting an image signal of an image to be displaced. The optical unit generates an image based on the image signal outputted from the circuit substrate and projects the generated image. The combiner is provided at one end of the optical unit, and the image is projected onto the combiner. The turning member connects the optical unit to the substrate housing portion in a freely rotatable manner. The plate-like attachment plate is used to mount the substrate housing portion to a rear-view mirror such that the optical unit is freely rotatable without coming into contact with the rear-view mirror inside a vehicle.

9 Claims, 25 Drawing Sheets

(52) U.S. Cl.
CPC . *B60K2350/2052* (2013.01); *G02B 2027/013* (2013.01); *G02B 2027/0123* (2013.01); *G02B 2027/0147* (2013.01); *G02B 2027/0154* (2013.01); *G02B 2027/0169* (2013.01); *G02B 2027/0181* (2013.01)

(56) References Cited

FOREIGN PATENT DOCUMENTS

| JP | 07-223459 A | 8/1995 |
|---|---|---|
| JP | 09-101478 A | 4/1997 |
| JP | 09-311290 A | 12/1997 |
| JP | 10-278629 A | 10/1998 |
| JP | 10-318769 A | 12/1998 |
| JP | 2000-249965 A | 9/2000 |
| JP | 2003-104086 A | 4/2003 |
| JP | 2006-62501 A | 3/2006 |
| JP | 2006-205955 A | 8/2006 |
| JP | 2007-322535 A | 12/2007 |
| JP | 2011-107283 A | 6/2011 |
| JP | 2012-078564 A | 4/2012 |

OTHER PUBLICATIONS

International Preliminary Report on Patentability, issued in PCT Application No. PCT/JP2013/003571, dated Dec. 31, 2014.
Notification of Reason(s) for Refusal in Japanese Patent Application No. 2012-148022, dated Sep. 29, 2015.
Notification of Reason(s) for Refusal in Japanese Patent Application No. 2012-148023, dated Sep. 8, 2015.
Notification of Reason(s) for Refusal in Japanese Patent Application No. 2012-148024, dated Sep. 29, 2015.
Notification of Reason(s) for Refusal in Japanese Patent Application No. 2012-148034, dated Sep. 29, 2015.

* cited by examiner

DISPLAY APPARATUS FOR VEHICLE

CROSS REFERENCE TO RELATED APPLICATION

Priority is claimed to Japanese Patent Application No. 2012-148006, filed on Jun. 29, 2012, the entire content of which is incorporated herein by reference.

Priority is claimed to Japanese Patent Application No. 2012-148025, filed on Jun. 29, 2012, the entire content of which is incorporated herein by reference.

Priority is claimed to Japanese Patent Application No. 2012-148033, filed on Jun. 29, 2012, the entire content of which is incorporated herein by reference.

Priority is claimed to Japanese Patent Application No. 2012-148034, filed on Jun. 29, 2012, the entire content of which is incorporated herein by reference.

Priority is claimed to Japanese Patent Application No. 2012-148035, filed on Jun. 29, 2012, the entire content of which is incorporated herein by reference.

Priority is claimed to Japanese Patent Application No. 2012-148022, filed on Jun. 29, 2012, the entire content of which is incorporated herein by reference.

Priority is claimed to Japanese Patent Application No. 2012-147991, filed on Jun. 29, 2012, the entire content of which is incorporated herein by reference.

Priority is claimed to Japanese Patent Application No. 2012-148023, filed on Jun. 29, 2012, the entire content of which is incorporated herein by reference.

Priority is claimed to Japanese Patent Application No. 2012-148024, filed on Jun. 29, 2012, the entire content of which is incorporated herein by reference.

Priority is claimed to Japanese Patent Application No. 2012-161970, filed on Jul. 20, 2012, the entire content of which is incorporated herein by reference.

BACKGROUND

1. Field of the Invention

The present invention relates to a display apparatus for a vehicle (hereinafter referred to as "automotive display apparatus" or "vehicular display apparatus" also).

An automotive display apparatus, which is called a head-up display (hereinafter referred to as "HUD" also), is known in the art. The HUD is a display apparatus that displays items of information such that the items of information are being superimposed on an outside scenery by using an optical element called a combiner. Here, the combiner transmits the light entering from the exterior of a vehicle and, simultaneously, reflects an image projected from an optical unit placed inside the vehicle. The HUD can have the driver of the vehicle visually recognize the information on the image projected from the optical unit while the driver seeing and observing the outside scenery in front of him/her almost never needs to change his/her line of sight and focusing point. Thus, the HUD is recently attracting attentions as a display apparatus for use in a vehicle.

Patent Document 1 in the following Related Art Documents discloses a technique where the visible space in an HUD installed in the dashboard of a vehicle is adjusted by using an X-axis stage, a Y-axis stage and a rotation stage.

[Patent Document 1] Japanese Unexamined Patent Application Publication JPH10-278629.

In a vehicle's passenger compartment (interior of the vehicle), position and space available for the installation of HUD are limited. However, it is desirable that the space be provided such that the combiner be movable in in order that a user, who is the driver, can easily see the image formed by the combiner.

SUMMARY

The present invention has been made under the foregoing circumstances, and a purpose thereof is to provide an automotive display apparatus capable of adjusting a visible range of an image to be displaced and capable of being placed in a limited space.

A display apparatus, for a vehicle, according to one embodiment of the present invention includes: a substrate housing portion that contains a circuit substrate for outputting an image signal of an image to be displaced; an optical unit that generates an image based on the image signal outputted from the circuit substrate, the optical unit including a projection unit that projects the generated image by light emitted from a light source; a combiner onto which the image is projected, the combiner being provided at one end of the optical unit; a turning member that connects the optical unit to the substrate housing portion in a freely rotatable manner; and a plate-like attachment plate with which to mount the substrate housing portion to a rear-view mirror such that the optical unit is freely rotatable by the turning member without coming into contact with the rear-view mirror inside a vehicle.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Figure 1:
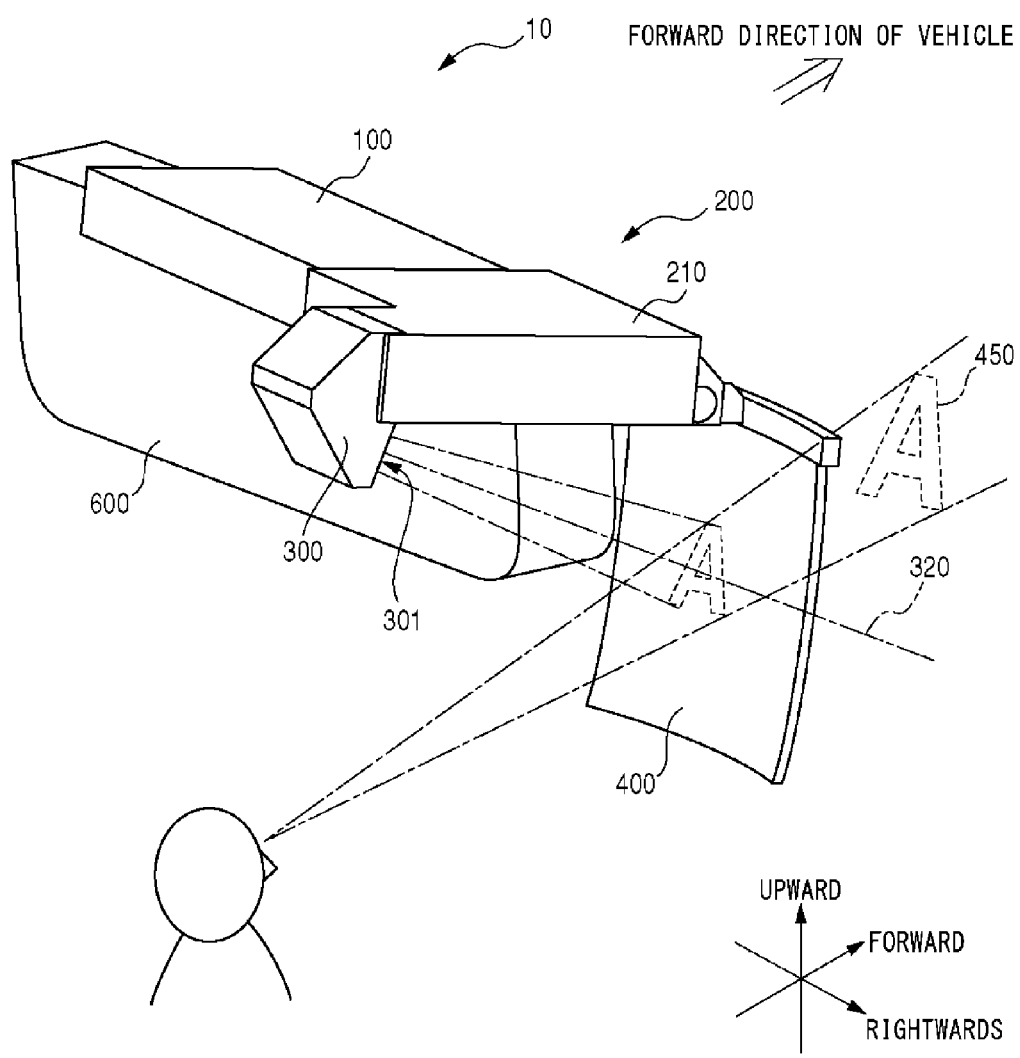
FIG. 1 is a perspective view obtained when a head-up display, which is a display apparatus for a vehicle according to an embodiment of the present invention, is observed from a field of view within from a vehicle's passenger compartment.

Embodiments of the present invention will now be described with reference to the Figures. Specific numerical values and so forth shown in the embodiments are only exemplary for ease of understanding of the present invention and does not intend to limit the scope of the present invention unless otherwise stated accordingly. The components and functions practically identical to or equivalent to those shown in the disclosed patent specification and each Figure are given the same reference numerals or symbols, and the repeated explanation thereof is omitted. Also, the depiction of components or elements not directly related to the embodiments of the present invention is omitted in the Figures.

[External Structure of a Display Apparatus, for a Vehicle, According to an Embodiment]

Figure 2:
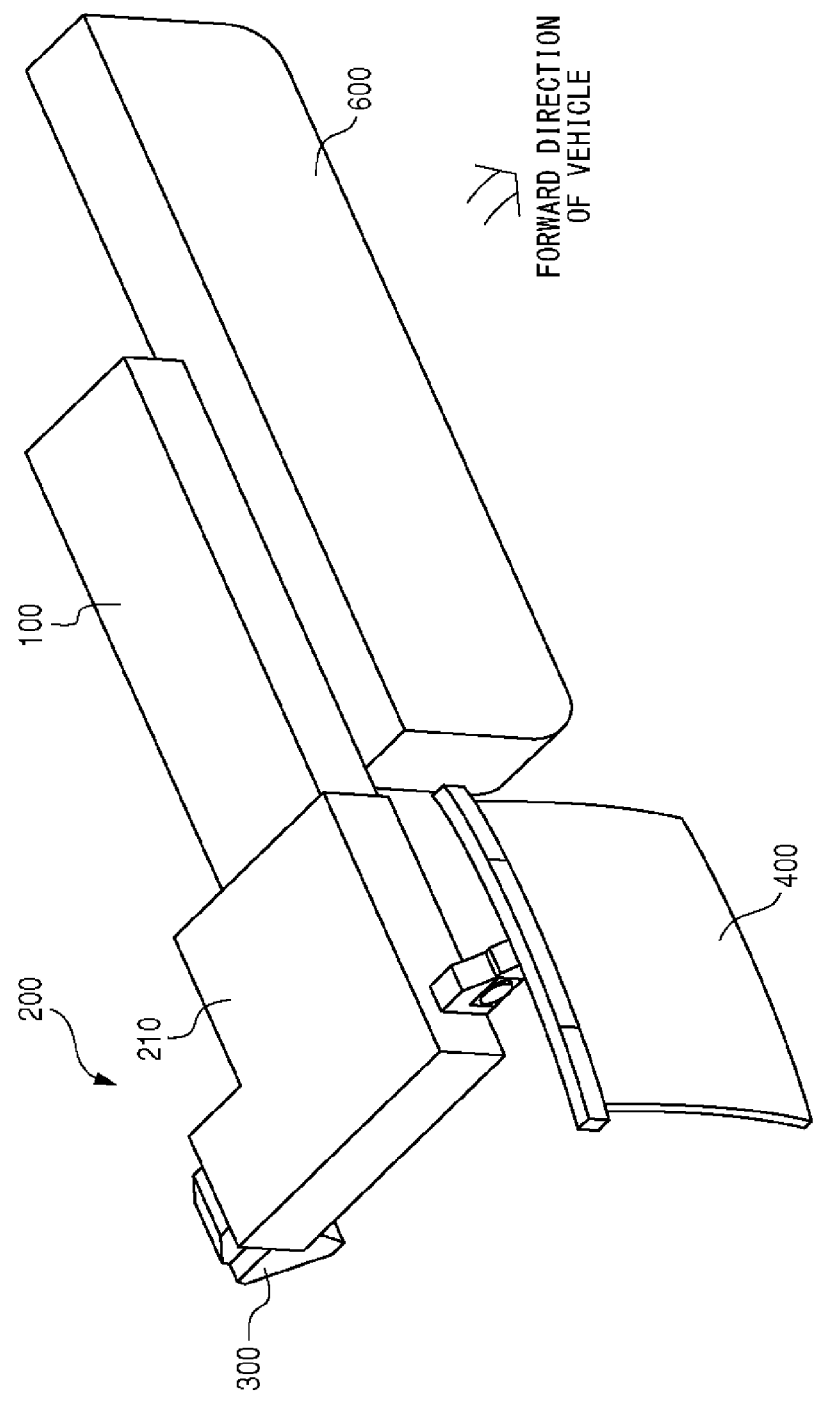
FIG. 2 is a perspective view obtained when the head-up display of FIG. 1 is observed from a field of view directed from a windshield side.

A head-up display (HUD), which is mounted on a rear-view mirror of a vehicle, is herein exemplified as the display apparatus, for the vehicle, according to the present embodiment. A description will be given of an external structure of the HUD with reference to FIG. 1 and FIG. 2. Hereinafter a display apparatus for a vehicle may be referred to as an "automotive display apparatus" or a "vehicular display apparatus" also. FIG. 1 is a perspective view showing a mode in which a head-up display (HUD) 10 according to the present embodiment is observed from a field of view directed toward a not-shown windshield of the vehicle from a rear-view mirror 600, to which the HUD 10 is mounted. FIG. 2 is a perspective view showing a mode in which the HUD 10 is observed from a field of view directed toward the rear-view mirror 600 from the not-shown windshield. In the following description, a front and a back direction, a left and a right direction, and an up and a down direction indicated herein and in the Figures respectively represent a frontward and a rearward direction of the vehicle, a left-side and a right-side direction thereof, and a first direction vertical to a road surface, where the vehicle is located, with the first direction being on a vehicle side and a second direction opposite to the first direction.

The HUD 10 generates an image signal related to an image displayed on a combiner 400 as a virtual image. The HUD 10 includes a substrate housing portion 100 that contains a circuit substrate 111 (see FIG. 5) for outputting the thus generated image signal to an optical unit 200. The circuit substrate 111 can receive an image signal outputted from a not-shown external device such as a navigation device and a media reproduction device and can perform a predetermined processing on the inputted signal and then output the processed signal to the optical unit 200. The substrate housing portion 100 is coupled to an attachment member 500 (see FIG. 19), which is one of constituent components of the HUD 10, and the rear-view mirror 600 is held by the attachment member 500. Thereby, the HUD 10 is mounted on the rear-view mirror 600. A detailed description will be later given of each mechanism concerning the coupling of the substrate housing portion 100 and the attachment member 500 and the holding of the attachment member 500 on the rear-view mirror 600. Note that, for ease of description and understanding of a whole structure of the HUD 10, the depiction of the attachment member 500 is omitted in FIG. 1 and FIG. 2.

The HUD 10 includes an optical unit 200 to which the image signal outputted from the circuit substrate 111 is inputted. The optical unit 200 includes an optical unit main body 210 and a projection unit 300. The optical unit main body 210 contains a light source 231, an image display element 240, various kinds of optical lenses and so forth, which will be described later. The projection unit 300 contains various kinds of projection mirrors and an intermediate image screen 360, which will be described later. The image signal outputted from the circuit substrate 111 is projected onto the combiner 400, which is of a concave shape, from a projection port 301 as an image display light by way of each of the aforementioned components of the optical unit main body 210 and each of the aforementioned components of the projection unit 300. In the present embodiment, described herein is an example where a liquid crystal on silicon (LCOS), which is a reflection-type liquid crystal display panel, is used as the image display element 240. Instead, a digital micromirror device (DMD) may be used as the image display element 240. In such a case where used is other than LCOS, the image display element 240 will be configured by an optical system and a drive circuit suited to the display element used.

A user, who is the driver of the vehicle, recognizes the image display light projected thereon as the virtual image via the combiner 400. In FIG. 1, the projection unit 300 projects the image display light, which forms a character "A", onto the combiner 400. By looking at the combiner 400, the user recognizes as if the character "A" were being displayed 1.7 to 2.0 meters away from the user in a frontward direction of the vehicle. In other words, the user recognizes a virtual image 450. Here, a central axis of the image display light projected onto the combiner 400 from the projection unit 300 is defined to be a projection axis 320.

Though the detailed description will be discussed later, the optical unit 200 is so configured as to be rotatable relative to the substrate housing portion 100. Further, in the HUD 10 according to the present embodiment, the projection unit 300 and the combiner 400 are configured such that the directions in which they are mounted on and removed from predetermined surfaces of the optical unit main body 210 can be changed.

[Internal Structure of a Display Apparatus, for a Vehicle, According to an Embodiment: Optical System]

Figure 3:
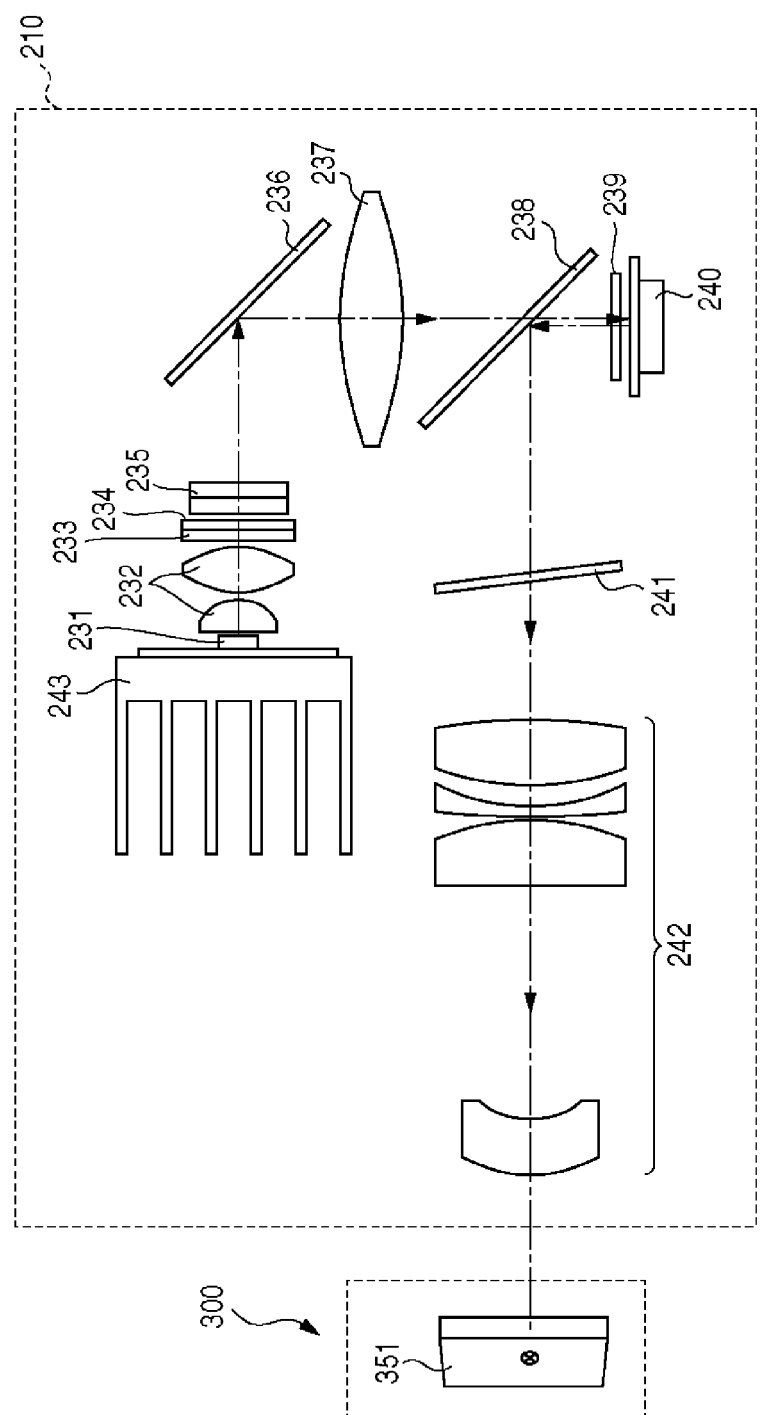
FIG. 3 shows an internal structure of an optical unit together with light paths.
Figure 4:
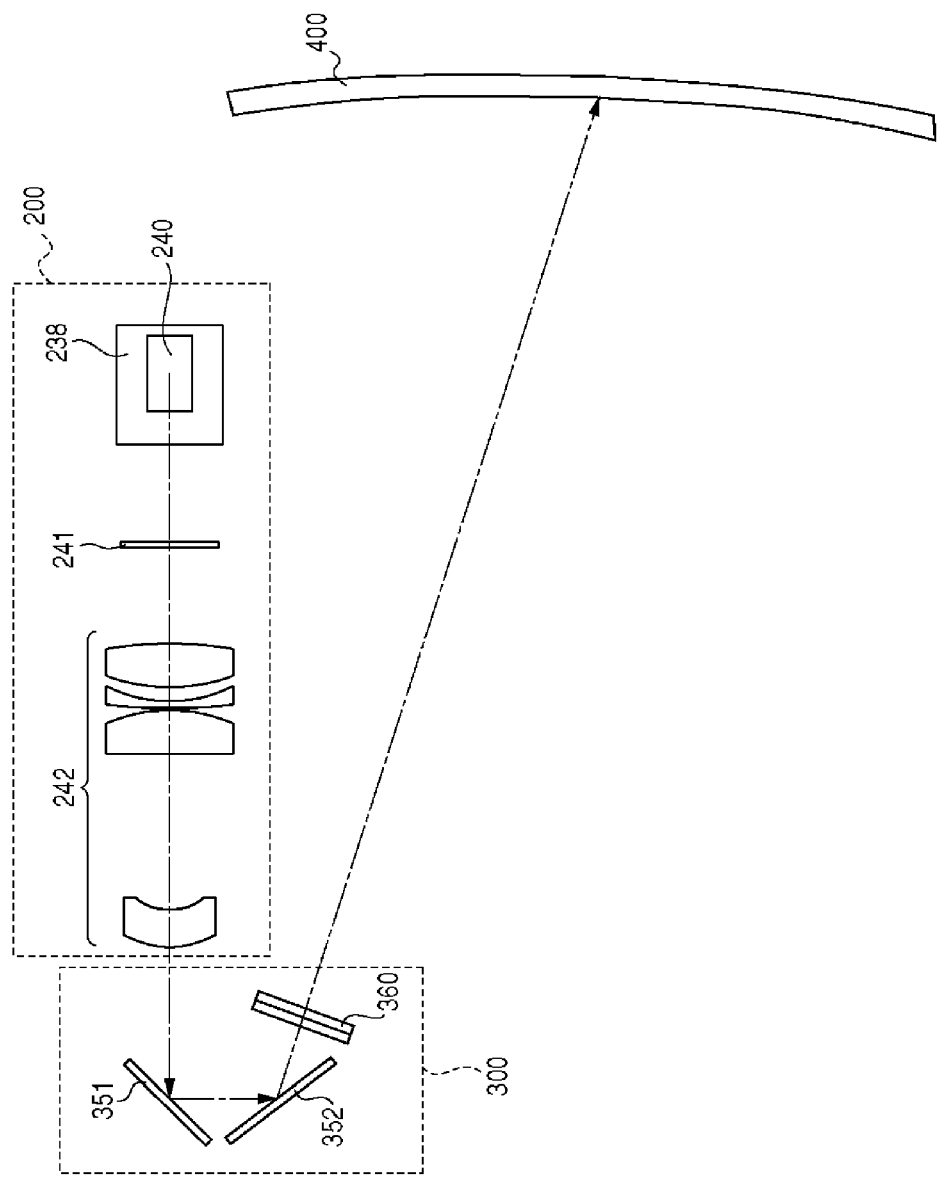
FIG. 4 shows an internal structure of an optical unit together with light paths.

A description is now given of an internal structure of the HUD 10. FIG. 3 and FIG. 4 are diagrams for explaining the internal structure of the optical unit 200 of the above-described HUD 10. FIG. 3 shows an internal structure of the optical unit main body 210 and part of an internal structure of the projection unit 300, together with light paths of the image display light. FIG. 4 shows an internal structure of the projection unit 300 and part of an internal structure of the optical unit main body 210, together with light paths of the image display light projected up to the combiner 400.

A description is first given of the internal structure of the optical unit main body 210 and the light paths of the image display light, with reference to FIG. 3. The optical unit main body 210 includes a light source 231, collimate lenses 232, an ultraviolet-infrared ray (UV-IR) cut filter 233, a polarizer 234, a fly-eye lens 235, a reflecting mirror 236, a field lens 237, a wire grid polarization beam splitter 238, a quarter-wave plate 239, an analyzer 241, a projection lens group 242, and a heatsink 243.

The light source 231 is comprised of a light-emitting diode (LED) that emits three colors of white or blue, green and red. The heatsink 243 for radiating the heat generated as a result of light emission so as to be cooled is mounted on the light source 231. The light emitted from the light source 231 is converted by the collimate lenses 232 into parallel light. The UV-IR cut filter 233 absorbs the ultraviolet light and the infrared light from the parallel light that has passed through the collimate lenses 232. The polarizer 234 converts the light, which has passed through the UV-IR cut filter 233, into stable p-polarized light. Then the fly-eye lens 235 adjusts the light, which has passed through the polarizer 234, such that the brightness thereof is evenly distributed.

The reflecting mirror 236 reflects the light path of light, which has passed through each cell of the fly-eye lens 235, by 90 degrees. The light reflected by the reflecting mirror 236 is condensed by the field lens 237. The light condensed by the field lens 237 is irradiated to the image display element 240 by way of the wire grid polarization beam splitter 238 and the quarter-wave plate 239 that transmit the p-polarized light.

The image display element 240 has a red color filter, a green color filter and a blue color filter for each pixel. The light irradiated to the image display element 240 becomes a color associated with each pixel, is then modulated by a liquid crystal composition provided in the image display element 240, and thereby becomes s-polarized image display light so as to be irradiated toward the wire grid polarization beam splitter 238. The irradiated s-polarized light is reflected by the wire grid polarization beam splitter 238, thereby changing its light path. The reflected s-polarized light passes through the analyzer 241 and then enters the projection lens group 242.

The image display light, which has passed through the projection lens group 242, exits the optical unit main body 210 and then enters the projection unit 300. Then a first projection mirror 351 provided in the projection unit 300 changes the light path of the image display light that has entered the projection unit 300.

A description is now given of the internal structure of the projection unit 300 and the light paths of the image display light with reference to FIG. 4. The projection unit 300 includes a first projection mirror 351, a second projection mirror 352, and an intermediate image screen 360.

As discussed earlier, the light path of the image display light, which has passed through the wire grid polarization beam splitter 238, the analyzer 241 and the projection lens group 242 provided in the optical unit main body 210, is converted by the first projection mirror 351 and the second projection mirror 352 to a light path directed toward the combiner 400. Along these light paths, a real image based on the image display light reflected by the second projection mirror 352 is image-formed on the intermediate image screen 360. An image display light of the real image, which has been image-formed on the intermediate image screen 360, transmits the intermediate image screen 360 and is projected onto the combiner 400. As described above, the user comes to recognize a virtual image of this projected image display light ahead of him/her.

By employing the internal structure thereof as described above, the user can visually recognize the virtual image based on the image signal outputted from the circuit substrate 111 via the combiner 400 in a manner such that the virtual image is overlaid or superimposed onto an actual scenery.

[Internal Structure of a Display Apparatus, for a Vehicle, According to an Embodiment: A Detail of Internal Structure of the Optical Unit 200]

The optical unit 200 is so configured as to be rotatable relative to the substrate housing portion 100. A detailed description is now given of internal structures of the optical unit 200 and the substrate housing portion 100, centering around a vicinity of a connection portion of the optical unit 200 and the substrate housing portion 100.

Figure 5:
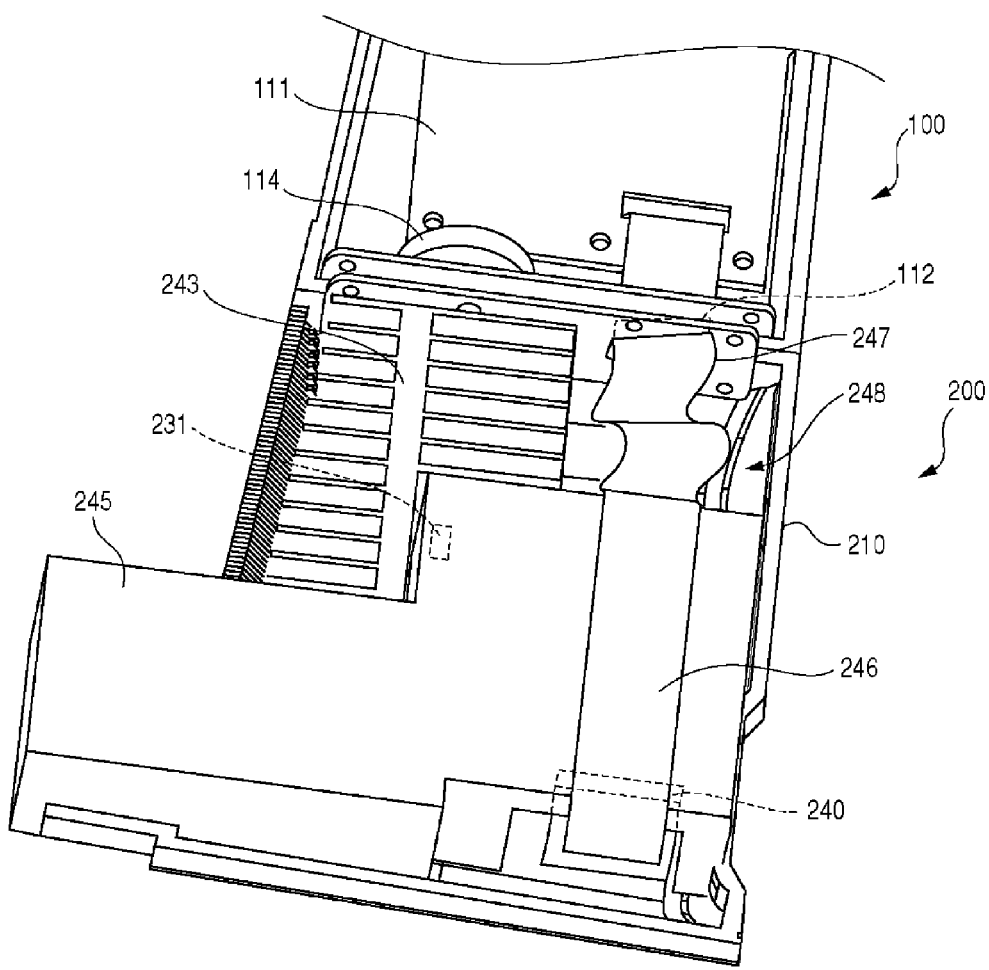
FIG. 5 shows part of interior of an optical unit and part of interior of a substrate housing portion.

FIG. 5 shows part of interior of the optical unit 200 and part of interior of the substrate housing portion 100. FIG. 5 mainly shows the vicinity of the connection portion where the optical unit 200 and the substrate housing portion 100 are connected to each other. An optical system placement unit 245, which constitutes part of the optical unit 200, houses various kinds of devices or components therein, as described above, excluding the heatsink 243. The heatsink 243 and a space 248 are provided near the connection portion (between the substrate housing portion 100 and the optical unit 200) located on a substrate housing portion 100 side of the optical system placement unit 245 within the optical unit 200.

The circuit substrate 111 electrically controls the image display element 240 and the light source 231 contained in the optical system placement unit 245. The circuit substrate 111 and the image display element 240, contained in the optical system placement unit 245, are connected by a flexible cable 246, which is a wiring. Here, the flexible cable 246 is merely exemplary and, instead, a flexible substrate or another kind of wiring through which the electric signals are transmitted may be used. The optical unit 200 is configured such that an optical unit side opening 247 is formed on one surface of a casing, whereas the substrate housing portion 100 is configured such that a substrate housing portion side opening 112 is formed on one surface of a casing. The flexible cable 246 connects the circuit substrate 111 and the image display element 240 through the optical unit side opening 247 and the substrate housing portion side opening 112. The flexible cable 246 preferably has a sufficient cable length so that the substrate housing portion 100 and the optical unit 200 can be freely turned relative to each other.

Figure 6:
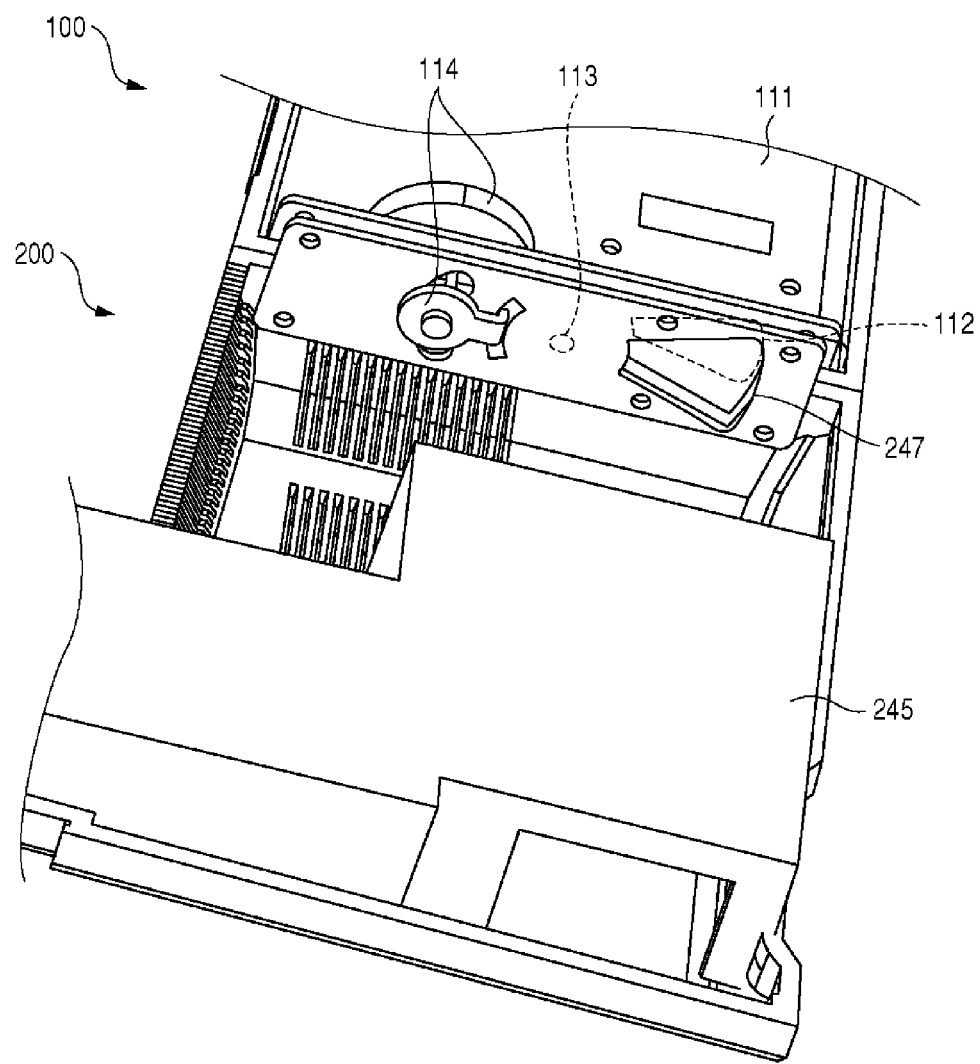
FIG. 6 shows a substrate housing portion and an optical unit with a heatsink and a flexible cable removed therefrom.

FIG. 6 shows part of exterior of the optical unit 200 of FIG. 5 and part of exterior of the substrate housing portion 100 thereof where the aforementioned heatsink 243 and the flexible cable 246 are removed.

The optical unit side opening 247 and the substrate housing portion side opening 112 are each formed in a shape such that each of the openings has two opposite sides extending at a predetermined angle formed therebetween.

For example, the optical unit side opening 247 and the substrate housing portion side opening 112 are each formed in an approximately fan-like shape. Thereby, if the optical unit 200 is turned relative to the substrate housing portion 100 as will be described later, a first force or a second force exerting on its casing can be reduced. Here, the first force is the force exerted on the casing having a surface where the optical unit side opening 247 of the optical unit 200 is provided; the second force is the force exerted on the casing having a surface where the substrate housing portion side opening 112 is provided. This configuration and arrangement can prevent the flexible cable 246 from being damaged or cut by each casing when the optical unit 200 is turned relative to the substrate housing portion 100.

Also, as described above, the space 248 is formed near the connection portion of the substrate housing portion 100 in the optical unit 200, and the flexible cable 246 is mainly contained in this space 248 of the optical unit 200. Formation of this space 248 ensures a space enough to contain and hold the flexible cable 246 having a sufficient length. Thus, if the optical unit 200 is turned relative to the substrate housing portion 100, a tensile force (tension) applied to the flexible cable 246 can be reduced. This configuration and arrangement can therefore prevent the flexible cable 246 from being damaged or cut as the result of the tension applied when the optical unit 200 is turned relative to the substrate housing portion 100.

The optical unit 200 and the substrate housing portion 100 connected to each other by a hinge 113 and a rotation lock mechanism 114. Here, the hinge 113 is a turning member that serves as a turning axis for the turning movements of both the optical unit 200 and the substrate housing portion 100, and the rotation lock mechanism 114 restricts a range of rotatable angles. The rotation lock mechanism 114 The optical unit 200 turns relative to the substrate housing portion 100 by a predetermined angle with the hinge 113 as the center. Though the hinge 113 is used in the present embodiment, a turning member other than the hinge 113 may be used.

As described above, the substrate housing portion side opening 112 of the substrate housing portion 100 and the optical unit side opening 247 of the optical unit 200 are of approximately fan-like shapes. When the substrate housing portion 100 turns relative to the optical unit 200, an opening, formed by both the substrate housing portion side opening 112 and the optical unit side opening 247, through which to permit the passage of the flexible cable 246 is narrowed. However, since the substrate housing portion side opening 112 and the optical unit side opening 247 each has a fan-like shape, a sufficient size of the opening to permit the passage of the flexible cable 246 is maintained within a restricted range of angles by the rotation lock mechanism 114.

It is to be noted here that the aforementioned shapes of the substrate housing portion side opening 112 and the optical unit side opening 247 are merely exemplary and may be arbitrary as long as, for example, the shape thereof does not damage the flexible cable 246 when the substrate housing portion 100 turns relative to the optical unit 200. For example, only one of the substrate housing portion side opening 112 and the optical unit side opening 247 may be so formed in a shape that two opposite sides of the opening extends at a predetermined angle formed therebetween, and thereby no load is imposed on the flexible cable 246.

As described above, the HUD 10 is configured such that the optical unit 200 and the substrate housing portion 100 are rotatable relative to each other with the hinge 113 as the center. The combiner 400 is mounted to the optical unit 200, and the substrate housing portion 100 is mounted on the rear-view mirror 600 by the attachment member 500. This configuration and arrangement allow the user to adjust the observation angle of the rear-view mirror and the observation angle of the combiner 400 independently from each other. Thus, the user can adjust the rear-view mirror 600 at an angle at which a rearward area of the vehicle can be appropriately verified and, at the same time, can adjust a field angle of the combiner 400, so that the user can recognize an appropriate distortion-free image (virtual image).

Also, the space 248, in which the flexible cable 246 with a sufficient length is to be contained and held, is ensured and provided inside the optical unit 200. Thereby, the optical unit 200 is freely rotatable relative to the substrate housing portion 100 and therefore the user can properly adjust the aforementioned observation angles. As a result, the flexible cable 246 can be prevented from being damaged or cut by the tension applied when the optical unit 200 is turned relative to the substrate housing portion 100.

Further, the substrate housing portion side opening 112 and the optical unit side opening 247 of the optical unit 200 are of approximately fan-like shapes as described above. This can prevent the flexible cable 246 from being damaged or cut by each of casings' outside walls when the optical unit 200 is turned relative to the substrate housing portion 100, so that the user can properly adjust the aforementioned observation angles.

Also, as shown in FIG. 3, in the present embodiment, the light path of the image display light is twice bent in two different directions by 90 degrees by using the reflecting mirror 236 and the wire grid polarization beam splitter 238, respectively. The image display light is emitted into the projection unit 300 in a direction opposite to the direction of emission of light at the light source 231. In this manner, the path of the image display light is U-shaped and thereby the wiring can be arranged such that the flexible cable 246 is not brought close to the light source 231 (see FIG. 5). This arrangement can not only prevent the noise caused by the electromagnetic waves generated from the light source 231 from being mixed into the image signal but also prevent the flexible cable 246 from being damaged by the heat generated by the light source 231. Further, the heatsink 243 installed near the light source 231, too, is so arranged as to be spaced away from the flexible cable 246. Hence, the space 248 for storing the flexible cable 246 therein can be provided.

Figure 7:
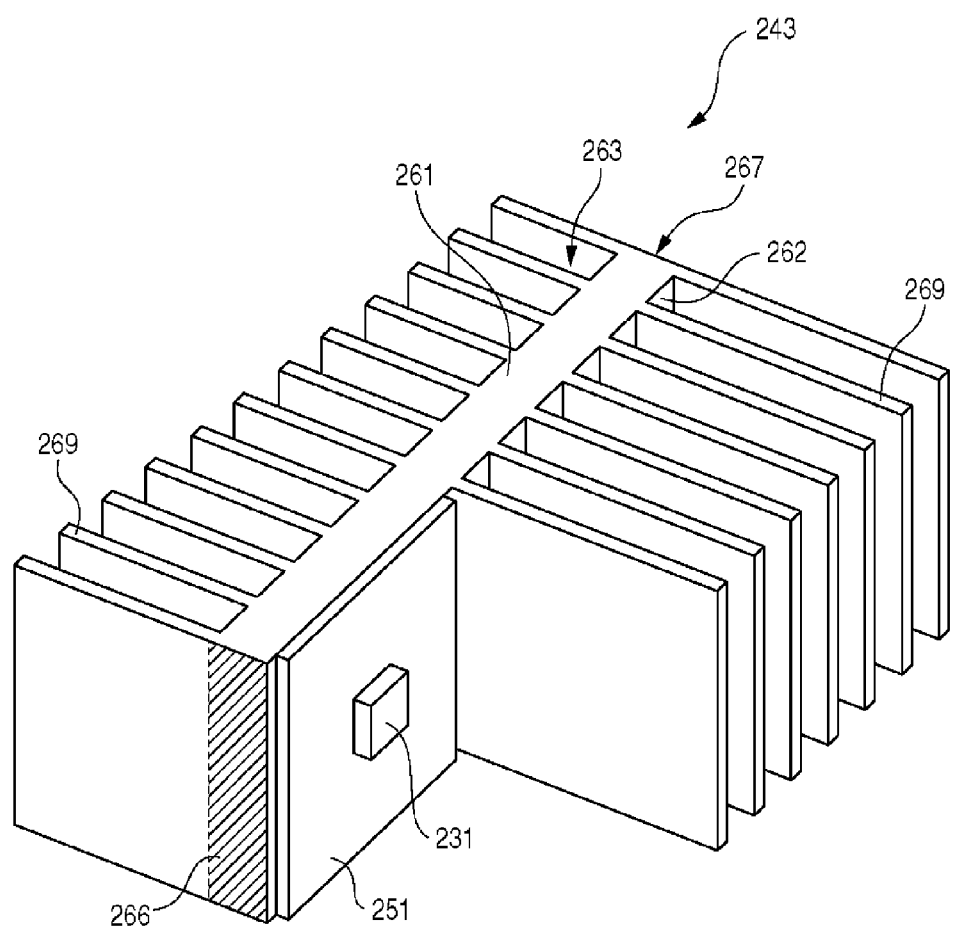
FIG. 7 is a perspective view showing a heatsink, which is a heat radiating unit and which is so provided as to allow the above-described arrangement in the optical unit.
Figure 8:
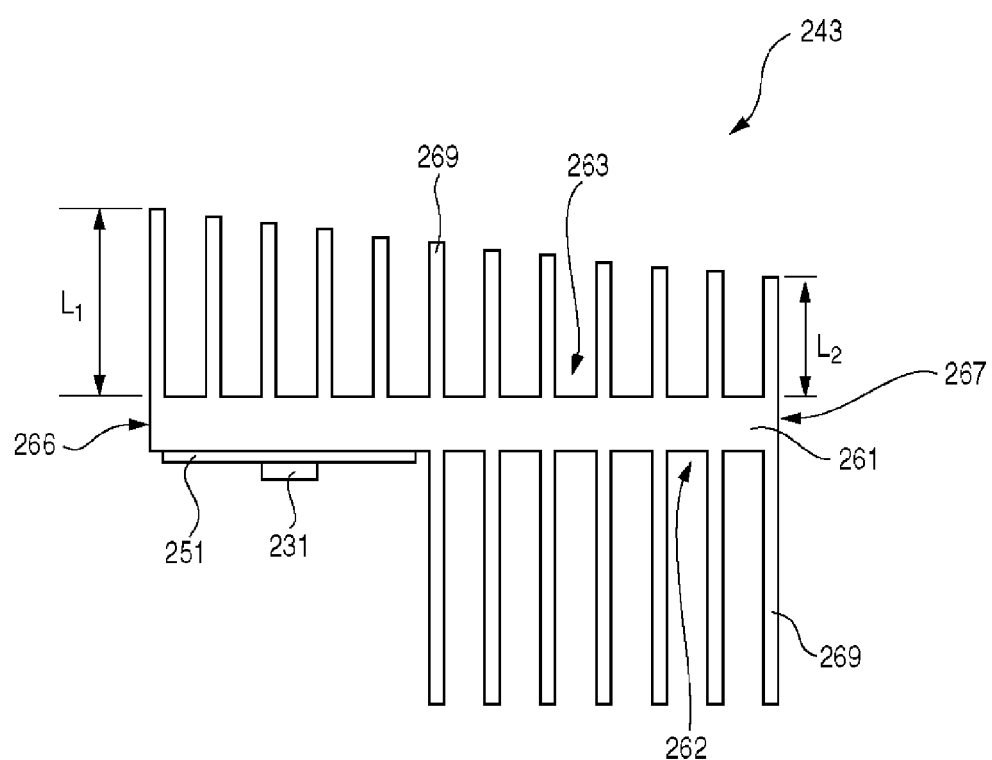
FIG. 8 is a top view of the heatsink shown in FIG. 7.

FIG. 7 is a perspective view showing the heatsink 243, which is a heat radiating unit and which is so provided as to allow the above-described arrangement in the optical unit 200. FIG. 8 is a top view of the heatsink 243. As illustrated in FIG. 7 and FIG. 8, the heatsink 243 is configured by a base material section 261, which is a plate-like member, and fins 269, which are plate-like members thinner than the base material section 261 and which are a plurality of blade members so formed as to extend upright relative to the surfaces of the base material section 261. Here, the base material section 261 has a first surface 262, which faces and belongs to an area where the light source 231 serving as the heat source is placed via a light source board 251, and a second surface 263, which is located on the back of the first surface 262. The base material section 261 has a first end part 266, which is one end of the base material section 261 near the light source 231, and a second end part 267, which is one end thereof opposite to the first end part 266. A predetermined region of the first surface 262 extending from the first end part 266 toward the second end part 267 is a region, where the light source 231 and the light source board 251, which is the circuit substrate of the light source 231, are placed, and is a flat region where no fins 269 are formed. Here, the length of each fin 269 is defined to be the vertical distance thereof from the surface of the base material section 261. Then, as shown in FIG. 8, the respective lengths of the fins 269 arranged on the second surface 263 decrease uniformly from length $L_1$ to length $L_2$, in the direction starting from the first end part 266 toward the second end part 267. In the present embodiment, each fin 269 is formed such that each fin 269 is vertical to the first surface 262 and the second surface 263 and is parallel to the first end part 266 and the second end part 267. However, each fin 269 may be of a shape such that each fin 269 is connected to the surfaces of the base material section 261 at an angle other than 90 degrees. The heatsink 243 can be integrally formed by a metal made of aluminum, an aluminum alloy, or any other metal.

The heat produced by the light source 231 is transferred from a position on the first surface 262 where the light source 231 is placed and is then transferred along the base material section 261 in two separate directions that are a direction of the first end part 266 (first direction) and a direction of the second end part 267 (second direction). Let us now direct our attentions to the position where the light source 231 is placed. Then, the fins 269 on the second surface 263 are formed such that the lengths thereof decrease uniformly starting from a position corresponding to the placement position of the light source 231, namely a position corresponding to the back surface side of the light source 231, and such that the lengths thereof increase uniformly toward the first end part 266. This is because the heat radiation efficiency is raised in a first region and a second region as follows. That is, the surface area of the fins 269 is increased in the first region (corresponding to the first direction), nearer to the light source 231, which starts from the position corresponding to the light source 231 toward the second end part 267. Since the light source 231 is already near in the second region (corresponding to the second direction) that starts from the position corresponding to the light source 231 toward the first end part 266, the heat radiation efficiency is raised by enlarging the surface area of the fins 269 as much as possible even in the second direction away from the light source 231.

Figure 9:
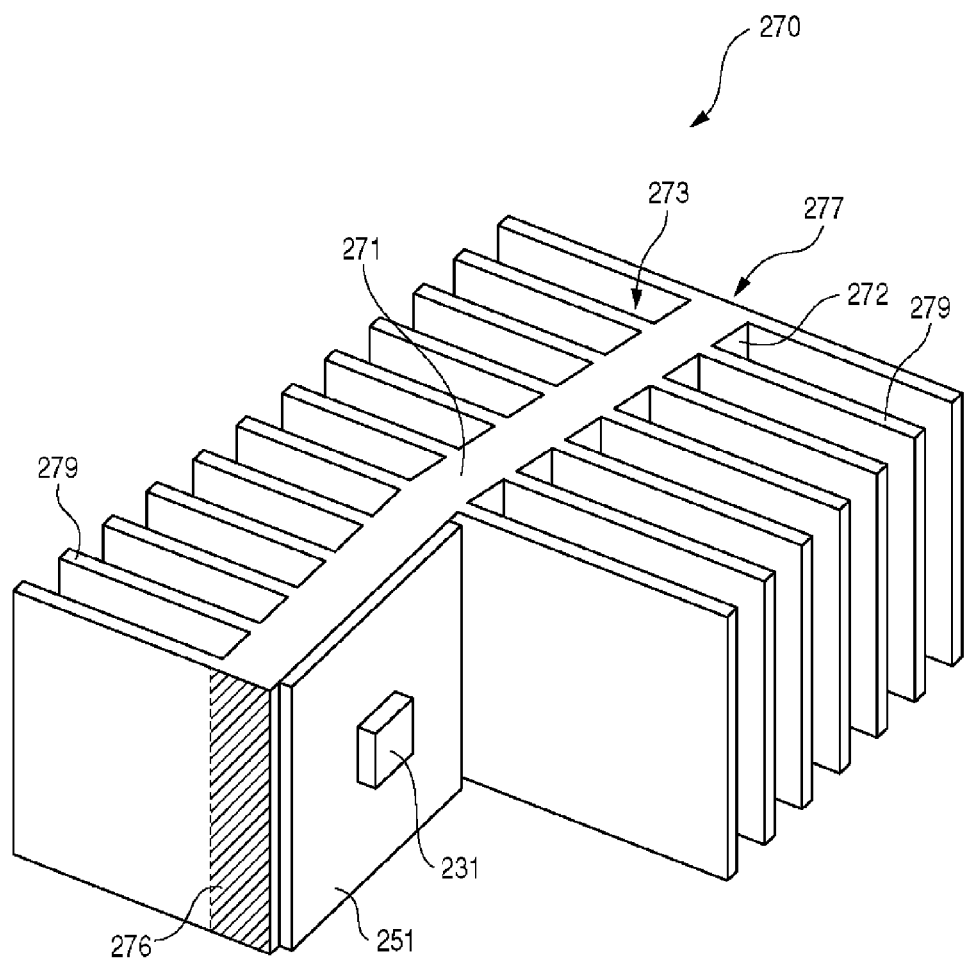
FIG. 9 is a perspective view showing a heatsink according to another embodiment of the above-described heatsink.
Figure 10:
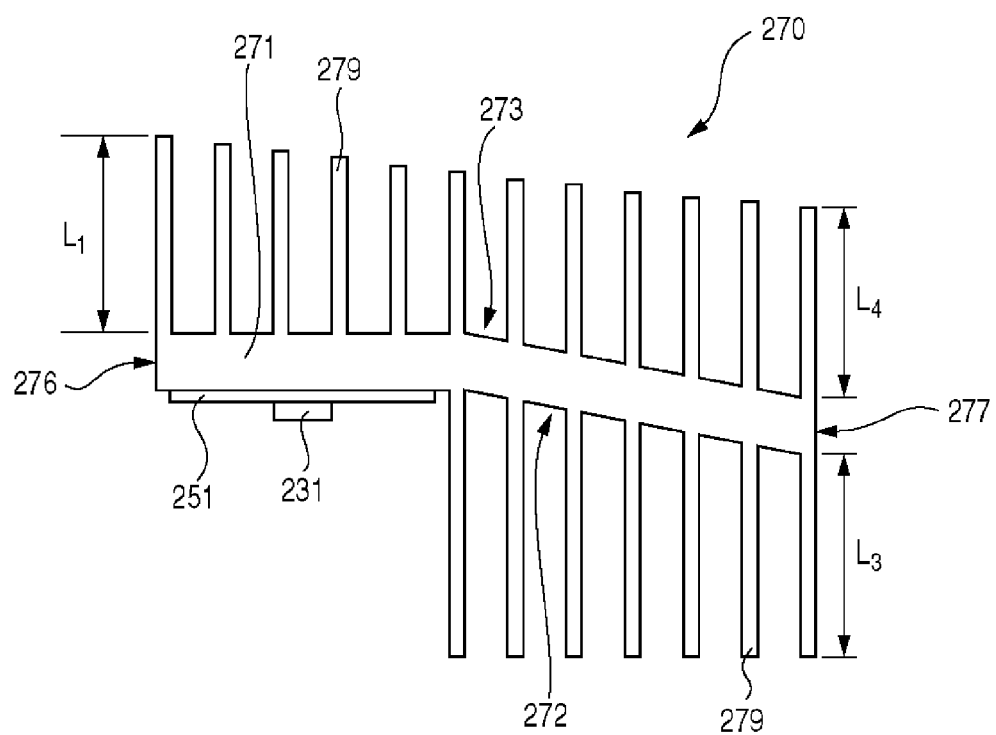
FIG. 10 is a top view of the heatsink shown in FIG. 9.

FIG. 9 and FIG. 10 are a perspective view and a top view of a heatsink 270, respectively, according to another embodiment of the heatsink 243. As illustrated in FIG. 9 and FIG. 10, similar to the heatsink 243, the heatsink 270 is configured by a plate-like base material section 271 and fins 279. Also, the base material section 271 has a first surface 272, which faces and belongs to an area where the light source 231 is placed via the light source board 251, and a second surface 273, which is located on the back of the first surface 272. Also, the base material section 271 has a first end part 276, which is one end of the base material section 271 near the light source 231, and a second end part 277, which is one end thereof opposite to the first end part 276. A predetermined region of the first surface 272 extending from the first end part 276 toward the second end part 277 is a region, where the light source 231 and the light source board 251 are placed, and is a flat region where no fins 279 are formed. What differs from the configuration shown in FIG. 7 and FIG. 8 is that the base material section 271, which is a plate-like member, is bent at the boundary between a flat region of the first surface 272 and the remaining region of the first surface 272 where the fins 279 are placed. And the fins 279 on the second surface 273 become gradually longer in length staring from the bent part (the boundary) position toward both the first end part 276 and the second end part 277. And the fins 279 on the first surface 272 become gradually shorter in length starting from the bent part (the boundary) position toward the second end part 277. As a result, the differences in length between the fins 279 on the first surface 272 and the fins 279 on the second surface 273 become gradually smaller starting from the bent part position toward the second end part 277. And length $L_3$ of the fin 279 at the second end part 277 of the first surface 272 is approximately equal to length $L_4$ of the fin 279 at the second end part 277 of the second surface 273. Also, the outer shape of the heatsink 270 is same as that of the heatsink 243 when the both heatsinks are viewed from top.

Similar to the heatsink 243 shown in FIG. 7 and FIG. 8, the heat produced by the light source 231 is transferred from a position on the first surface 272 where the light source 231 is placed and is then transferred along the base material section 271 in two separate directions that are a direction of the first end part 276 (first direction) and a direction of the second end part 277 (second direction). As described above, the differences in length between the fins 279 on the first surface 272 and the fins 279 on the second surface 273 become smaller starting from the bent part position toward the second end part 277. As a result, the difference in the heat radiation efficiency between the first surface 272 and the second surface 273 becomes smaller near the second end part 277 and therefore the overall heat radiation efficiency can be raised.

Figure 11:
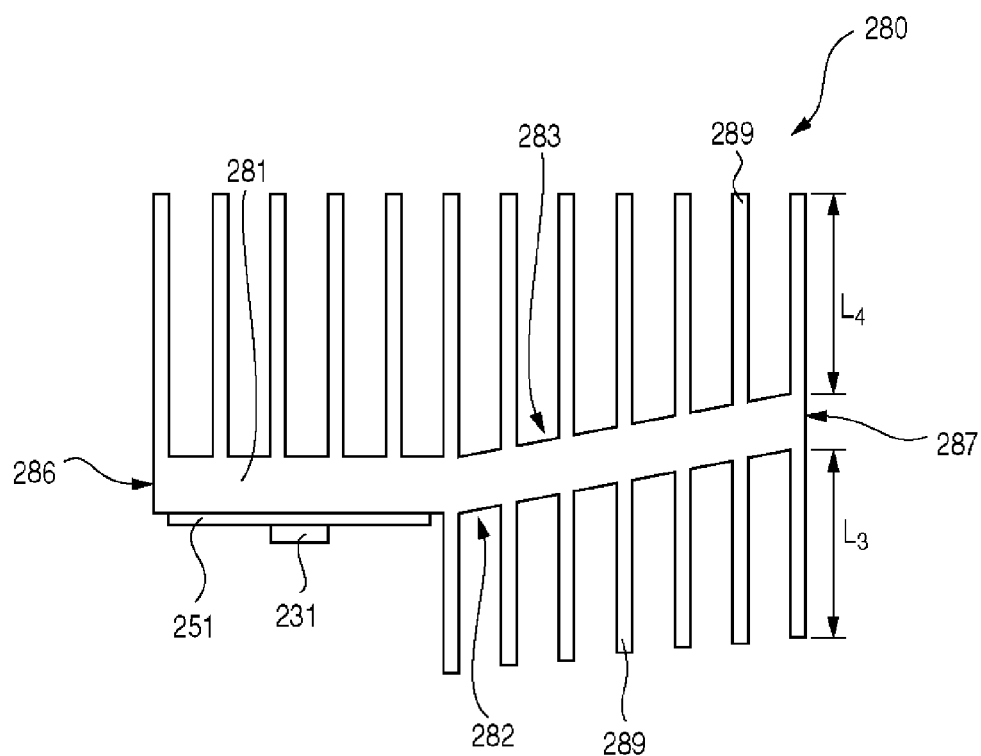
FIG. 11 shows a modification of the heatsink shown in FIG. 9.

FIG. 11 shows a heatsink 280 according to a modification of the heatsink 270, and the heatsink 280 of FIG. 11 is viewed in the same viewing field as that of FIG. 10. The heatsink 280 differs from the heatsink 270 in that a base material section 281 is bent toward a second surface 283 side, instead of toward a first surface 282 side where the light source 231 is placed. In this modification, fins 289 on the second surface 283 become gradually shorter in length staring from the bent part position toward a second end part 287. And fins 289 on the first surface 282 become gradually longer in length starting from the bent part position toward the second end part 287. Also, the differences in length between the fins 289 on the first surface 282 and the fins 289 on the second surface, which are placed in the mutually corresponding positions, become gradually smaller starting from the bent part position toward the second end part 287. And length $L_3$ of the fin 289 at the second end part 287 of the first surface 282 is approximately equal to length $L_4$ of the fin 289 at the second end part 287 of the second surface 283. On the other hand, the lengths of the fins 289 starting from the first end part 286 on the second surface 283 toward the bent part position are identical to each other. With this shape in the modification, too, the difference in the heat radiation efficiency between the first surface 282 and the second surface 283 becomes smaller near the second end part 287 and therefore the overall heat radiation efficiency can be raised.

Also, the heatsink 243 and the heatsink 270 are formed in the above-described shapes, so that the space 248 as shown in FIG. 5 can be provided. Provision of space 248 allows a redundant or extra portion of the flexible cable 246 to be contained or stored in the space 248. As a result, the optical unit 200 can be freely turned relative to the substrate housing portion 100.

[The Adjustment of Angle Using the Hinge]

Figure 12:
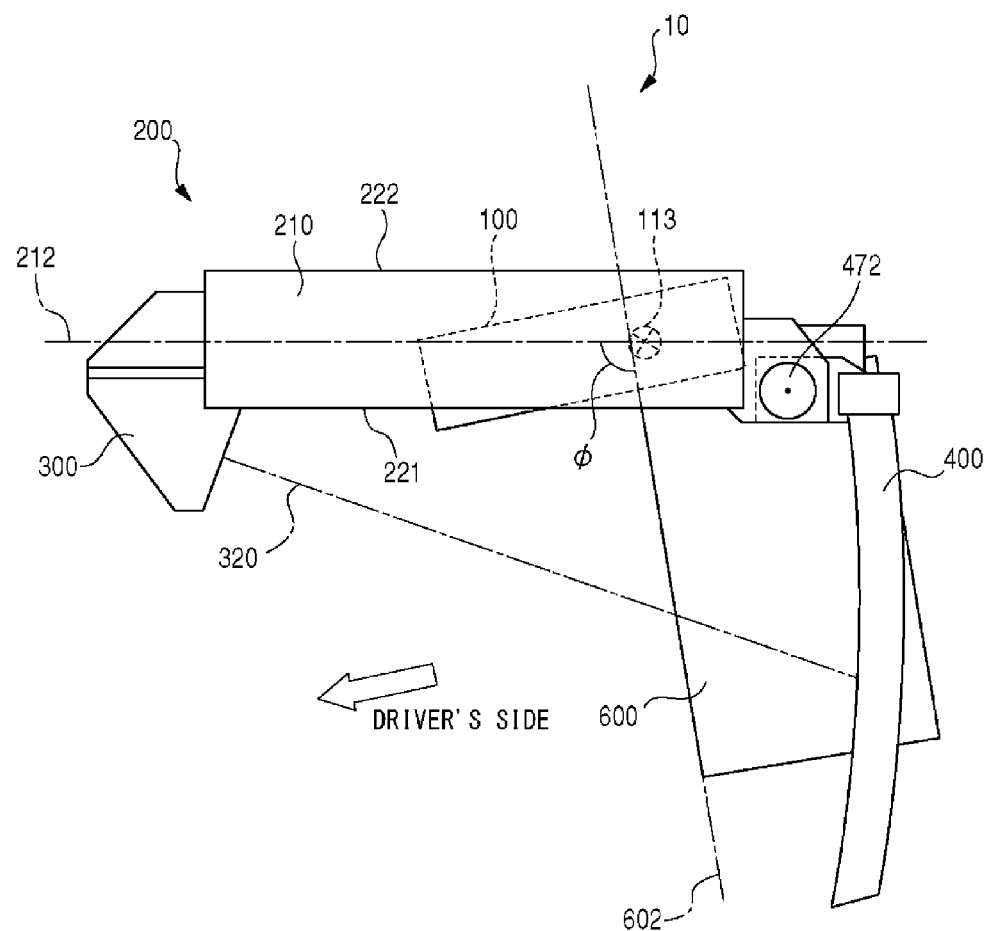
FIG. 12 is a side view of a head-up display mounted on a rear-view mirror.

A detailed description is now given of the turning of the above-described optical unit 200 relative to the substrate housing portion 100. FIG. 12 is a side view of a HUD mounted on the rear-view mirror 600. As illustrated in FIG. 12, the rear-view mirror 600 is normally oriented facing a driver so that the driver can see a rearward area of the vehicle. In other words, the driver rarely drives the vehicle in a state where a mirror surface 602 of the rear-view mirror 600 is exactly vertical to a vehicle base or a travelling road surface. Normally, the driver tilts the orientation of the rear-view mirror 600 such that the mirror surface 602 of the rear-view mirror 600 has certain degrees of angle formed with a plane vertical to the vehicle base or the like. Thus, when the HUD 10 is mounted to the rear-view mirror 600, the tilting of the rear-view mirror 600 also entails the formation of certain degrees of angle with respect to the plane vertical to the vehicle base or the like.

The inventors of the present invention had conducted experiments where the virtual image presented by the combiner 400 is made to be recognized by various users in many vehicles, and as a result the inventors had verified as follows through the experiments. The condition under which the experiments had been conducted was that the HUD 10 is installed such that the longitudinal direction of the rear-view mirror 600 is identical to the longitudinal direction of the substrate housing portion 100. Under this condition, the angles of the combiner 400 and the optical unit 200 are respectively adjusted so that the user can recognize the virtual image without being distorted. As a result of those experiments, the inventors had verified, in many cases, that a suitable angle formed between the mirror surface 602 and a reference surface 212 of the optical unit main body 210 is about 100 degrees, for example.

Here, the "reference surface" of the optical unit main body 210 is an angle measurement reference surface used for the measurement of an inclination of the optical unit main body 210 relative to the mirror surface 602 of the rear-view mirror 600. An example of the reference surface 212 is a plane including an optical axis of the optical unit main body 210 or a plane parallel to said plane. Another example of the reference surface 212 is a first main body surface 221, which is a lower surface of the optical unit main body 210 when the HUD 10 is mounted to a vehicle with the steering wheel on the right side, or a second main body surface 222 disposed counter to the first main body surface 221, or a plane parallel to the first main body surface 221 and the second main body surface 222. The "reference surface" of the optical unit main body 210 may be the reference surface of the optical unit 200.

In the light of the above-described experimental results, the HUD 10 according to the present embodiment is designed so that an optimal image without any deformations can be presented when an angle formed between the mirror surface 602 and the reference surface 212 is a predetermined reference angle under the following condition. The condition is that the HUD 10 is mounted to the rear-view mirror 600 using the attachment member 500, attachment plates 571 and 581 and so forth such that the longitudinal direction of the rear-view mirror 600 is identical to the longitudinal direction of the substrate housing portion 100. More specifically, in order that the optimal image can be presented under the above-described condition, an optical portion constituting the optical system of the HUD 10 is designed.

Here, the "optical portion constituting the optical system of the HUD 10" is a group of components whereby an image display light is generated based on the image signal outputted from the circuit substrate 111 contained in the substrate housing portion 100 and is projected. More specifically, the optical portion is the whole or a predetermined part of the following components in the optical unit main body 210, the following components in the projection unit 300, and the combiner 400. That is, the components in the optical unit main body 210 are the light source 231, the collimate lenses 232, the ultraviolet-infrared ray (UV-IR) cut filter 233, the polarizer 234, the fly-eye lens 235, the reflecting mirror 236, the field lens 237, the wire grid polarization beam splitter 238, the quarter-wave plate 239, the analyzer 241 and the projection lens group 242. And the components in the projection unit 300 are the first projection mirror 351, the second projection mirror 352 and the intermediate image screen 360.

Also, the "predetermined reference angle" is an angle formed between the mirror surface 602 and the reference surface 212 and is an angle assumed as a design standard when an optical design of the HUD 10 is carried out. The "predetermined reference angle" may be determined through the experiments so that the best suited image without any deformations can be presented to the various users in many vehicles. An example of the predetermined reference angle is an obtuse angle and more specifically 110 degrees, for example. Also, the "predetermined reference angle" is denoted by $\phi$ in FIG. 12.

In this manner, the optical portion constituting the optical system is designed in the HUD 10 according to the present embodiment on the basis that the angle formed between the mirror surface 602 and the reference surface 212 is the predetermined angle. Thus, the optical design is carried out optimally according to the inclination of the rear-view mirror 600 assumed normally in use. When the HUD 10 is mounted so that the best suited image without any deformations can be presented to the various users in many vehicles, the optical unit 200 is kept in a near-horizontal position in many cases. Since the optical unit 200 does not directly face the user, the sense of being oppressed on the user, who is the driver, can be reduced.

The substrate housing portion 100 mounted by use of the attachment member 500, which is not shown in FIG. 12, is mounted and secured to the rear-view mirror 600 that faces the user, as described above. Thus, the direction of the substrate housing portion 100 is changed and oriented the same way as the direction of the rear-view mirror 600 is changed and oriented. At the same time, as described above, the optical unit 200, including the projection unit 300, and the combiner 400 are integrally rotatable relative to the substrate housing portion 100 by the hinge 113. Thus, regardless of an angle at which the rear-view mirror 600 is adjusted, the driver can adjust the image in a visibly recognizable position without causing the deformation in the image (virtual image) projected onto the combiner 400.

Figure 13:
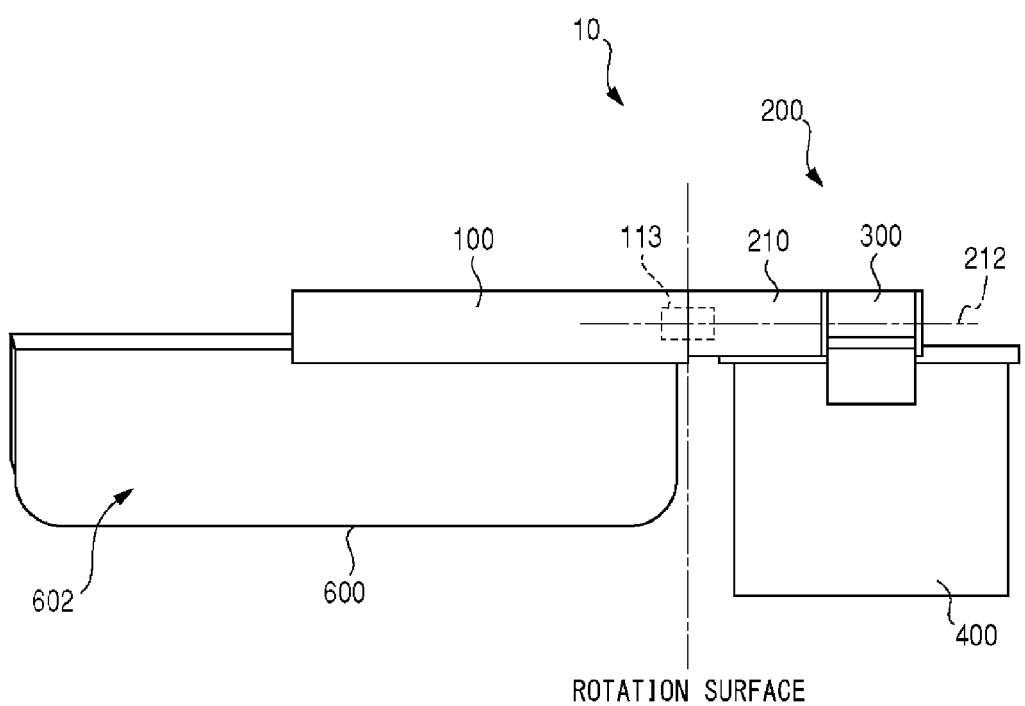
FIG. 13 is a front view of a head-up display mounted on a rear-view mirror.

FIG. 13 is a front view of the HUD 10 as viewed from a mirror surface 602 side of the rear-view mirror 600 of the HUD 10 mounted to the rear-view mirror 600. As illustrated in FIG. 13, a turning surface of the hinge 113, which is the boundary surface formed by the turning of the hinge 113 in between the substrate housing portion 100 and the optical unit 200, is a plane vertical to the mirror surface 602 and parallel to the projection axis 320. Thus, the turning surface thereof is in a position that does not cut across the rear-view mirror 600. This configuration and arrangement allow the optical unit 200 and the combiner 400 to be integrally turned without causing the optical unit 200 and the combiner 400 to come into contact with the rear-view mirror 600, while the substrate housing portion 100 is secured to the rear-view mirror 600.

Figure 14:
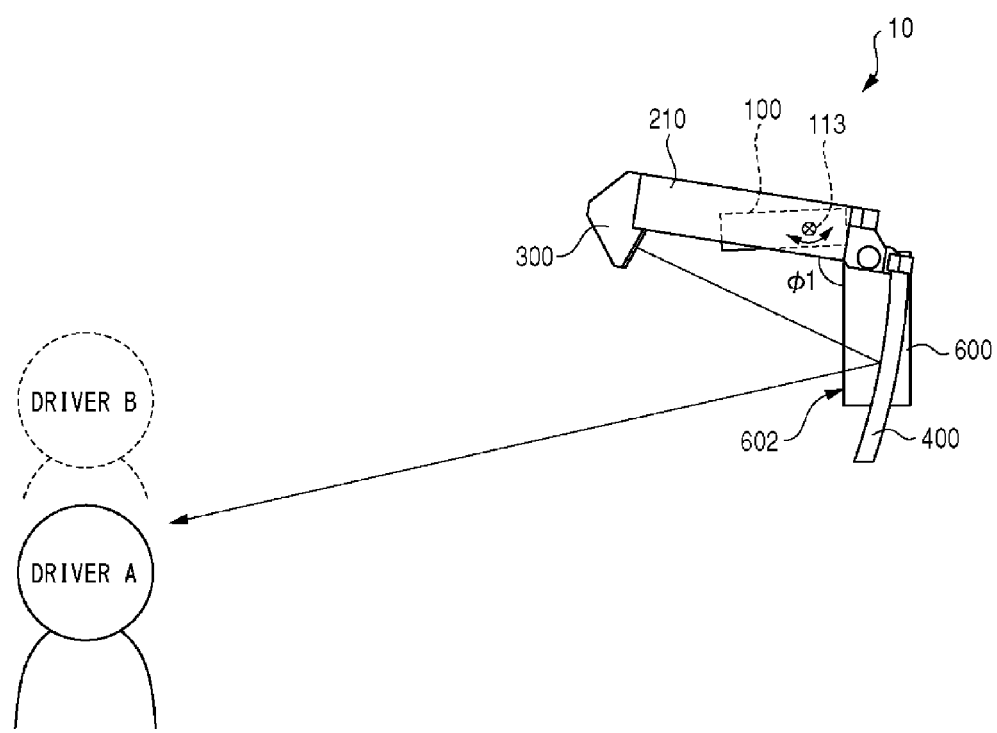
FIG. 14 shows a visible region of an image (virtual image) projected onto a combiner.
Figure 15:
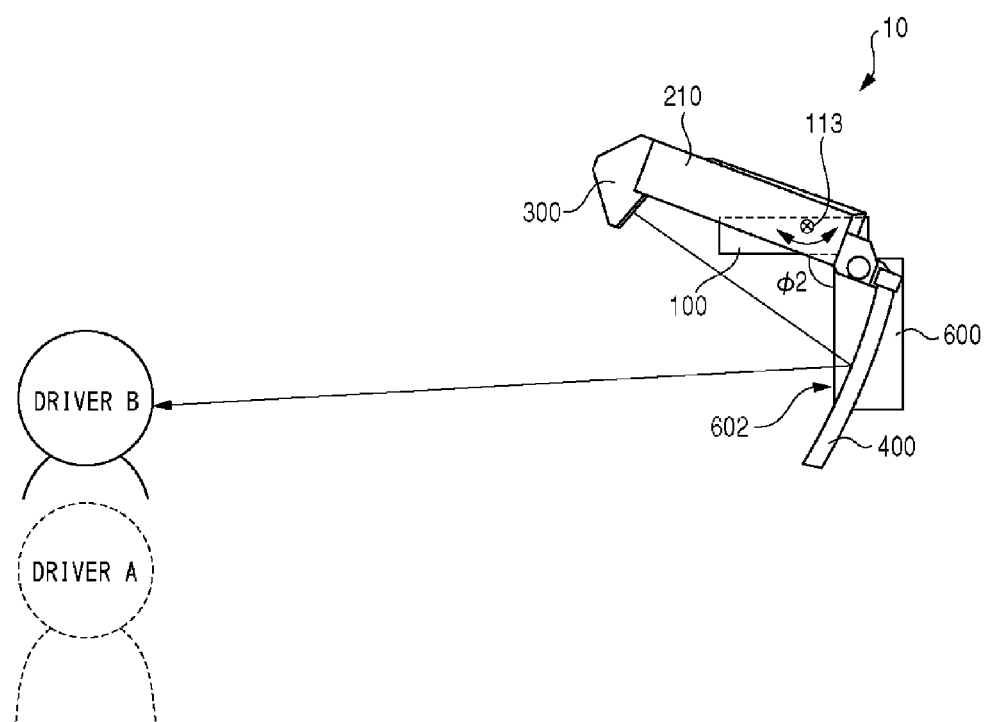
FIG. 15 shows a visible region of an image (virtual image) projected onto a combiner.

FIG. 14 and FIG. 15 are diagrams for explaining a space where an image (virtual image) projected onto the combiner 400 is visible and for explaining a change in the observation direction of the driver after the optical unit 200 and the combiner 400 are turned by way of the above-described hinge 113. Consider, for example, a case where both driver A and driver B, whose eye position is higher than that of the driver A, use a HUD 10 installed in the same vehicle. In this case, as illustrated in FIG. 14, the angle adjusted by the hinge 113 when the HUD 10 is used by the driver A is an angle φ1. At this angle, the HUD 10 allows the driver A to visually recognize the image (virtual image) projected onto the combiner 400 without causing any deformation in the image. On the other hand, as illustrated in FIG. 15, the angle adjusted by the hinge 113 when the HUD 10 is used by the driver B is an angle φ2, which is larger than the angle φ2. At this angle φ2, the HUD 10 allows the driver B to visually recognize the image (virtual image) projected onto the combiner 400 without causing any deformation in the image. The turning of the hinge 113 from the angle φ1 to the angle φ2 is achieved such that the position in which the image displayed by the combiner 400 as the virtual image is changed along a direction parallel to a straight line formed mainly by the turning surface and the mirror surface 602 of the rear-view mirror 600.

Thus, even though the HUD 10 according to the present embodiment is installed in a narrow space in a vehicle's passenger compartment, the projection direction of the image display light, emitted from the projection unit 300, and the combiner 400, onto which the image display light is projected, can be adjusted in a space saving manner. Also, since the optical unit 200 and the combiner 400 only can be integrally moved instead of moving the entire HUD 10, the space where the displayed image is visible can be easily adjusted.

[The Turning and the Attachment/Removal of the Combiner and the Projection Unit]

Figure 16:
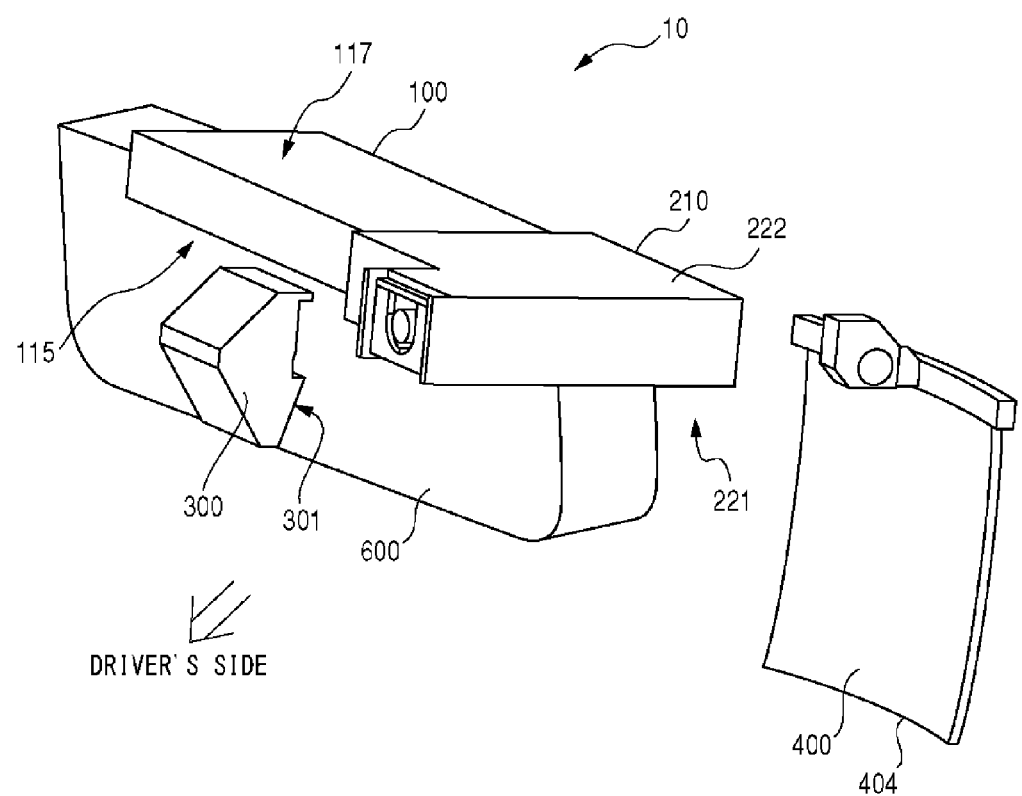
FIG. 16 shows a head-up display mounted to a right-hand drive vehicle with a projection unit and a combiner being detached therefrom.
Figure 17:
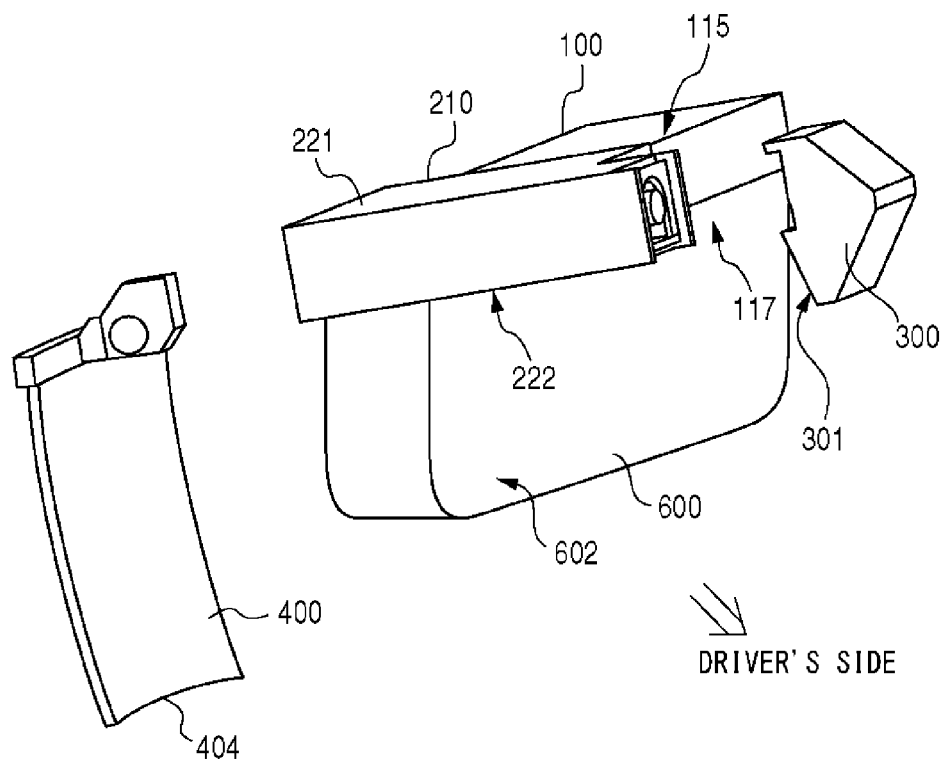
FIG. 17 shows a head-up display where a substrate housing portion is replaced so that the head-up display can be used for a left-hand drive vehicle.
Figure 18:
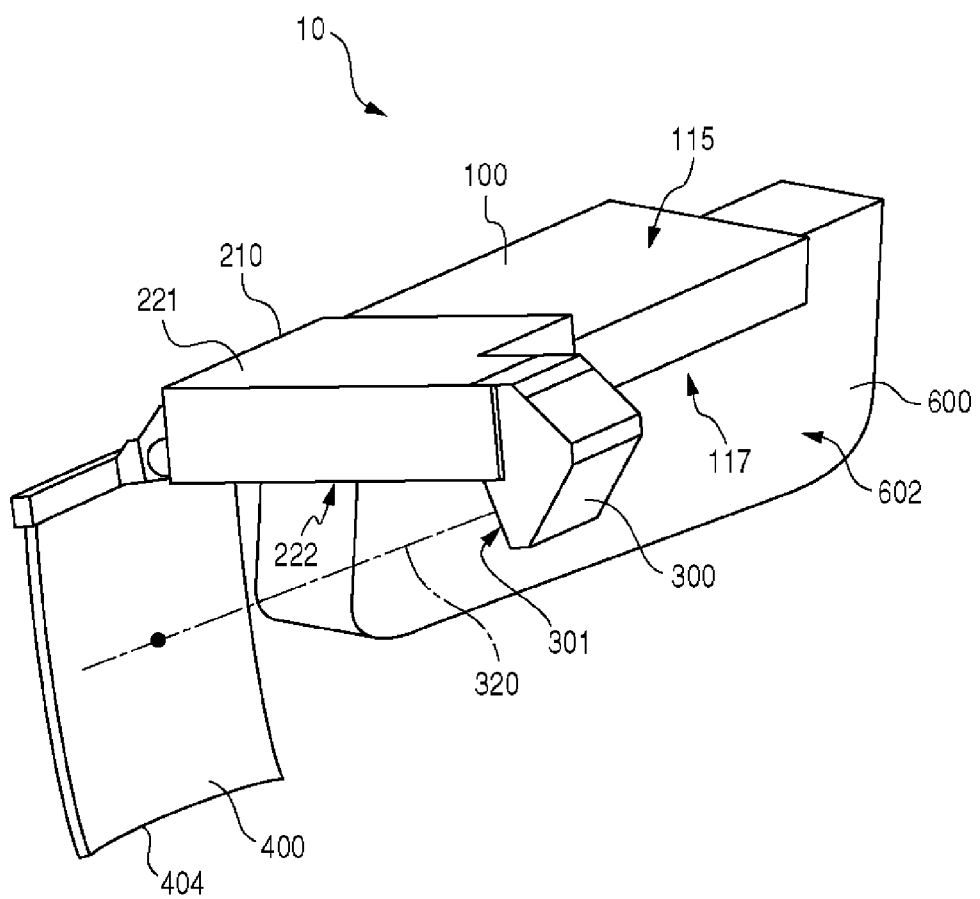
FIG. 18 shows a head-up display replaced so that the head-up display can be used for a left-hand drive vehicle.

FIG. 16, FIG. 17 and FIG. 18 are diagrams for explaining two cases where the HUD 10 are mounted in two different mounting positions corresponding to a right-hand drive vehicle and a left-hand drive vehicle. FIG. 16 shows how the HUD 10 mounted to a right-hand drive vehicle looks like when the projection unit 300 and the combiner 400 are detached from the optical unit main body 210. In the HUD 10 mounted to the right-hand drive vehicle, the optical unit main body 210 and the combiner 400 are placed on a right side (i.e., a driver side) of the rear-view mirror 600 as viewed from the driver side. The substrate housing portion 100 has a first attachment surface 115 and a second attachment surface 117, disposed counter to the first attachment surface 115. And the substrate housing portion 100 is mounted on the rear-view mirror 600, as shown in FIG. 16, such that the first attachment surface 115 is orientated in a direction where the first attachment surface 115 is in contact with the not-shown attachment member 500. The optical unit main body 210 has the first main body surface 221 on the same side as the first attachment surface 115 of the substrate housing portion 100. A surface disposed counter to the first main body surface 221 is the second main body surface 222.

The HUD 10 shown in FIG. 16 is mounted to the rear-view mirror 600 in the following arrangement. That is, the first attachment surface 115 of the substrate housing portion 100 and the first main body surface 221 of the optical unit main body 210 face downward, and the projection port 301 of the projection unit 300 and a lower end 606 of the combiner 400 are on a first main body surface 221 side. Thus, the projection axis 320 is on the first main body surface 221 side (see FIG. 1).

FIG. 17 shows a HUD 10 mounted to a left-hand drive vehicle. As shown in FIG. 17, when the HUD 10 is so installed as to be used for a left-hand drive vehicle, the HUD 10 is mounted on the rear-view mirror 600 such that the second attachment surface 117 of the substrate housing portion 100 faces downward and such that the second attachment surface 117 is orientated in a direction where the second attachment surface 117 is in contact with the not-shown attachment member 500. In this case, the optical unit main body 210 and the combiner 400 are placed on a left side (i.e., a driver side) of the rear-view mirror 600 as viewed from the driver side.

FIG. 18 shows a HUD 10 mounted to a left-hand drive vehicle. The HUD 10 is mounted on the rear-view mirror 600 in a state such that the second attachment surface 117 of the substrate housing portion 100 and the second main body surface 222 of the optical unit main body 210 face downward (face the same side) and such that the projection port 301 of the projection unit 300 and the lower end 606 of the combiner 400 are on a second main body surface 222 side.

As shown in FIG. 16 and FIG. 18, the projection unit 300 and the combiner 400 can be placed on the optical unit main body 210 even though the projection port 301 and the lower end 606 are either on the first main body surface 221 side or the second main body surface 222 side. Also, as shown in FIG. 16 and FIG. 17, it is possible to change the mounting directions of the projection unit 300 and the combiner 400 by detaching the projection unit 300 and the combiner 400 from the optical unit main body 210. Also, though not shown in FIG. 16 to FIG. 18, the optical unit main body 210, the projection unit 300 and the combiner 400 are connected with each other by the turning members, so that it is possible to change their mounting directions via the turning members. In other words, in the HUD 10, the mounting directions of the projection unit 300 and the combiner 400 relative to the optical unit main body 210 can be changed and then mounted with the changed directions. Thus, changing the mounting directions thereof allows the projection port 301, which emits the image display light, projected from the projection unit 300 onto the combiner 400, and the projection axis 320 of the image display light to be arranged and set on either the first main body surface 221 side or the second main body surface 222 side.

Even though, as shown in FIG. 18, the second attachment surface 117 faces downward, the projection unit 300 can be properly placed while the projection port 301 of the projection unit 300 lies on the second main body surface 222 side of the optical unit main body 210. Hence, the image display light is projected in a downward direction from the optical unit main body 210. This means that the projection axis 320 is on the second main body surface 222 side.

As described above, the projection unit 300 and the combiner 400 can be mounted to the optical unit main body 210 even though the projection port 301 and the lower end 606 are either on the first main body surface 221 side or the second main body surface 222 side of the optical unit main body 210. In other words, the projection unit 300 and the combiner 400 can be mounted thereto while the projection port 301 of the projection unit 300 and the lower end 606 of the combiner 400 are each in a position changed by 180 degrees relative to one of the surfaces of the optical unit main body 210 (the first main body surface 221 or the second main body surface 222). The mounting positions of the projection unit 300 and the combiner 400 relative to the optical unit main body 210 can be changed, and the mounting positions thereof relative to the first attachment surface 115 (or the second attachment surface 117) of the substrate housing portion 100 can also be changed.

When the projection unit 300 and the combiner 400 are mounted thereto by changing their respective mounting positions thereof by 180 degrees relative to the optical unit main body 210, the orientation of an image (virtual image) visible on the combiner 400 may be possibly changed by 180 degrees as compared with the image before the change of the mounting positions. In the light of this, the projection unit 300 in the HUD 10 corrects the orientation of the image by detecting the orientations and/or the mounting position of the projection unit 300 or the combiner 400 and by properly operating on an operation part of a not-shown control module such as a remote control unit. As a result, the circuit substrate 111 outputs an image signal whose orientation has been correctly changed as compared with that before the change of the mounting positions.

For example, in the HUD 10 mounted as shown in FIG. 16, the orientation of an image outputted from the projection port 301 of the projection unit 300 in a mounting position on the first main body surface 221 side is made to differ, by 180 degrees, from the orientation of an image outputted from the projection port 301 of the projection unit 300 in a mounting position on the second main body surface 222 side, and vice versa. This makes it possible to have the driver see images having the same orientation in the event that the mounting position of the projection unit 300 is changed relative to the optical unit main body 210.

Thereby, the image display element 240 outputs an image by changing the orientation (e.g., vertical/horizontal direction, 180 degrees) of the image according to the mounting position of the projection unit 300. Thus, the driver can visually recognize the image (virtual image) in the event that the mounting position is changed.

Also, when the HUD 10 is mounted to a left-hand drive vehicle, the turning surface of the hinge 113 is in a position that does not cut across the rear-view mirror 600, similarly to the case shown in conjunction with FIG. 13. This configuration and arrangement therefore allow the optical unit 200 and the combiner 400 to be integrally turned without causing the optical unit 200 and the combiner 400 to come into contact with the rear-view mirror 600, while the substrate housing portion 100 is secured to the rear-view mirror 600.

[Rear-View Mirror Attachment Member]

Figure 19:
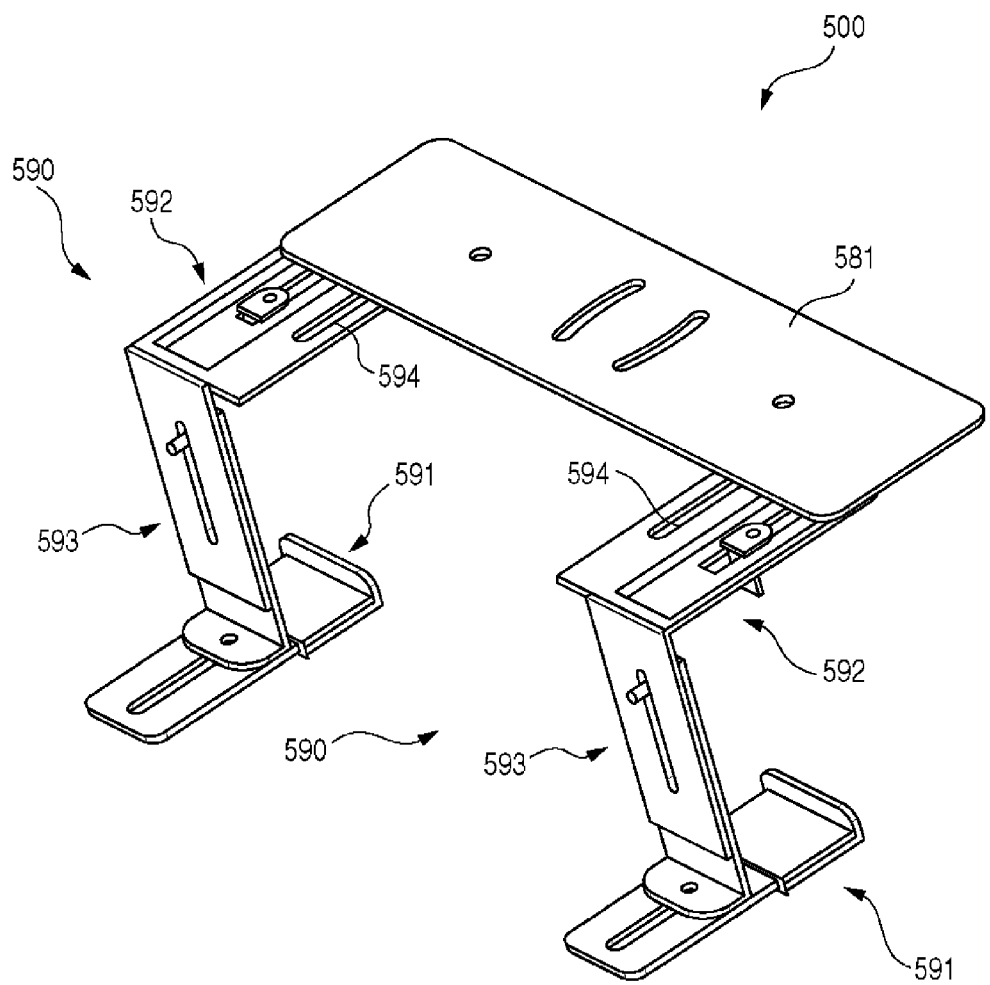
FIG. 19 is a perspective view showing a attachment member with which to mount a substrate housing portion on a rear-view mirror.

A detailed description is now given of a attachment member 500 with which to mount the HUD 10 on the rear-view mirror 600. FIG. 19 shows the attachment member 500 with which to mount the HUD 10 on the rear-view mirror 600. As shown in FIG. 19, the attachment member 500 has a pair of gripper portions 590 (a gripper pair 590), which is so fixed to the rear-view mirror 600 as to hold the rear-view mirror 600 tightly, and a attachment plate 581 with which to mount the gripper pair 590 and the substrate housing portion 100. The griper portions 590 include two lower side holding mechanisms 591, two upper side holding mechanisms 592, height adjustment portions 593, and position adjustment grooves 594. Here, the lower side holding mechanism 591 has a claw that is slidable back and forth for the purpose of holding a lower end of the rear-view mirror 600. The upper side holding mechanism 592 has a claw that is slidable back and forth for the purpose of holding an upper end of the rear-view mirror 600. The height adjustment portion 593 is vertically slidable for the purpose of vertically holding the rear-view mirror 600 from behind. The position adjustment groove 594 is a long hole (slit) for the purpose of adjusting the position of the attachment plate 581 relative to the gripper portions 590, and the position adjustment grooves 594 are located on an upper surface on which the attachment plate 581 is placed. Here, the attachment plate 581 is so placed as to lie across the respective upper surfaces of the pair of gripper portions 590, and is mounted such that a pair of projections 584 (described later) of the attachment plate 581 are engaged with the position adjustment grooves 594.

Figure 20:
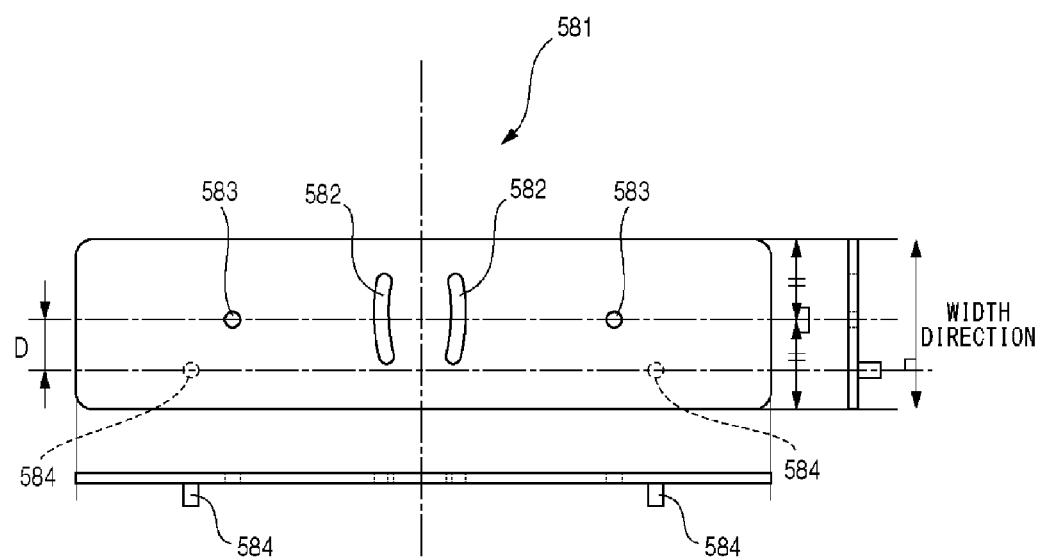
FIG. 20 is a set of three orthographic views of a attachment plate in the attachment member of FIG. 19.

FIG. 20 are three orthographic views of the attachment plate 581 in the attachment member 500 shown in FIG. 19. As shown in FIG. 20, the attachment plate 581 is formed of an approximately rectangular plate-like member as a whole. A flat surface of the attachment plate 581, which is the mounting surface thereof, has circular-arc holes 582, which are a pair of arc-shape holes having different orientations, central holes 583, which are a pair of holes formed respectively in the positions serving as the centers of circles based on the arcs of the circular-arc holes 582, and the projections 584. Here, the projections 584, located on the back surface side of the attachment plate 581, are formed such that, when the attachment plate 581 is mounted to the holding portions 590, the projections 584 are fitted into the position adjustment grooves 594 formed on the holding portions 590; thereby the attachment plate 581 is slidable by way of the projections 584, which are movably engaged with the position adjustment grooves 594, in longitudinal directions of the position adjustment grooves 594.

The central holes 583 are formed on a center line of a width direction, which is a direction perpendicular to a straight line connecting the pair of projections 584 of the attachment plate 581. In contrast to this, the pair of projections 584 are not provided on the center line of the aforementioned width direction but placed in positions spaced away by a certain distance (offset D) from the central line in the width direction. This allows the sliding ranges of the attachment plate 581 to greatly differ between a first state and a second state and therefore allows an adjustable range of positions of the substrate housing portion 100 to be enlarged. Here, the first state is a state where the attachment plate 581 is mounted such that the respective projections 584 are brought closer to the height adjustment portions 593 than the respective central holes 583. The second state is a state where the first state is rotated by 180 degrees, with a direction vertical to the surface of the attachment plate 581 being set as the rotation axis and with the pair of projections 584 facing downward, and two ends in the width direction are interchanged and used. More specifically, the second state is the state where the attachment plate 581 is mounted such that the projections 584 are located farther from the height adjustment portions 593 than the central holes 583.

The distance between the rear-view mirror 600 and a vehicle's windshield varies depending on the type of vehicle. Thus, as described above, the pair of projections 584 are placed in positions away from the central line by the offset D. This allows the degree of freedom of positions in fixing the HUD 10 to the rear-view mirror 600 in a front-back direction to increase, so that the HUD 10 can be mounted on various types of vehicles. Also, provision of a plurality of holding portions 590 (a single pair of holding portions in the present embodiment) allows the HUD 10 to be appropriately attached to an increased number of various types of vehicles.

Note that the distance between the pair of holding portions 590 may be determined such that the distance between the two position adjustment grooves 594 is equal to the distance between the two projections 584 of the attachment plate 581. Also, the pair of holding portions 590 can be arranged such that the distance between the two position adjustment grooves 594 is less than the distance between the two projections 584 thereof. Suppose that the pair of holding portions 590 are arranged in this manner. Since, in this case, the distance between the pair of projections 584 remains unchanged, the attachment plate 581 is obliquely mounted by necessity and therefore the attachment plate 581 can be mounted by varying the angle formed relative to the longitudinal direction. In other words, the attachment plate 581 can be obliquely mounted by turning the attachment plate 581 and the substrate housing portion 100 along a plane surface of the attachment plate 581. In this manner, a plurality of holding portions 590 (a single pair of holding portions in the present embodiment) are provided and then the distance between the plurality of holding portions 590 is adjusted. This configuration and arrangement can realize an increased number of various mounting positions.

When the substrate housing portion 100 is to be mounted, a surface of the attachment plate 581 (the surface thereof where no projections 584 is provided) and the first attachment surface or the second attachment surface of the substrate housing portion 100 are first arranged such that the surface of the attachment plate 581 overlaps with the first attachment surface or the second surface. Then, setscrews 118 (securing members) are inserted through the circular-arc holes 582 and the central holes 583, located in the centers of the arcs of the circular-arc holes 582, and the substrate housing portion 100 is secured by fastening the setscrews 118. When the substrate housing portion 100 is secured by fastening the setscrews 118, the substrate housing portion 100 is rotatable about the centers of the central holes 583 on the surface of the attachment plate 581, and adjusted is a direction where the normal line of a surface of the attachment plate 581 of the substrate housing portion 100 serves as a rotation axis. At this time, the substrate housing portion 100, the optical unit 200 and the combiner 400 are integrally turned with the central holes 583 as the centers. Thus, the driver can adjust the mounting angle (where the normal line of the surface of the attachment plate 581 serves as the rotation axis) so that the image (virtual image) displayed through the combiner 400 can be set in a visually recognizable position. A central angle of each circular-arc hole 582 is determined such that the central angle thereof lies within a sufficient range of angles at which the driver can adjust the image (virtual image), displayed through the combiner 400, in a visually recognizable position. The central angle of each circular-arc hole 582 is more preferably determined such that the central angle thereof is within a range of angles at which the combiner 400 does not come in contact with the windshield.

Assume here that an arc central direction of the circular-arc hole 582 is defined to be an internal side and that the reverse direction of the arch central direction is defined to be an external side. Then, in the present embodiment, the pair of circular-arch holes 582 are arranged such that the internal sides thereof face each other. However, depending on the position where the substrate housing portion 100 is secured by fastening the setscrews 118, the pair of circular-arch holes 582 may be arranged such that the external sides thereof face each other.

Figure 21:
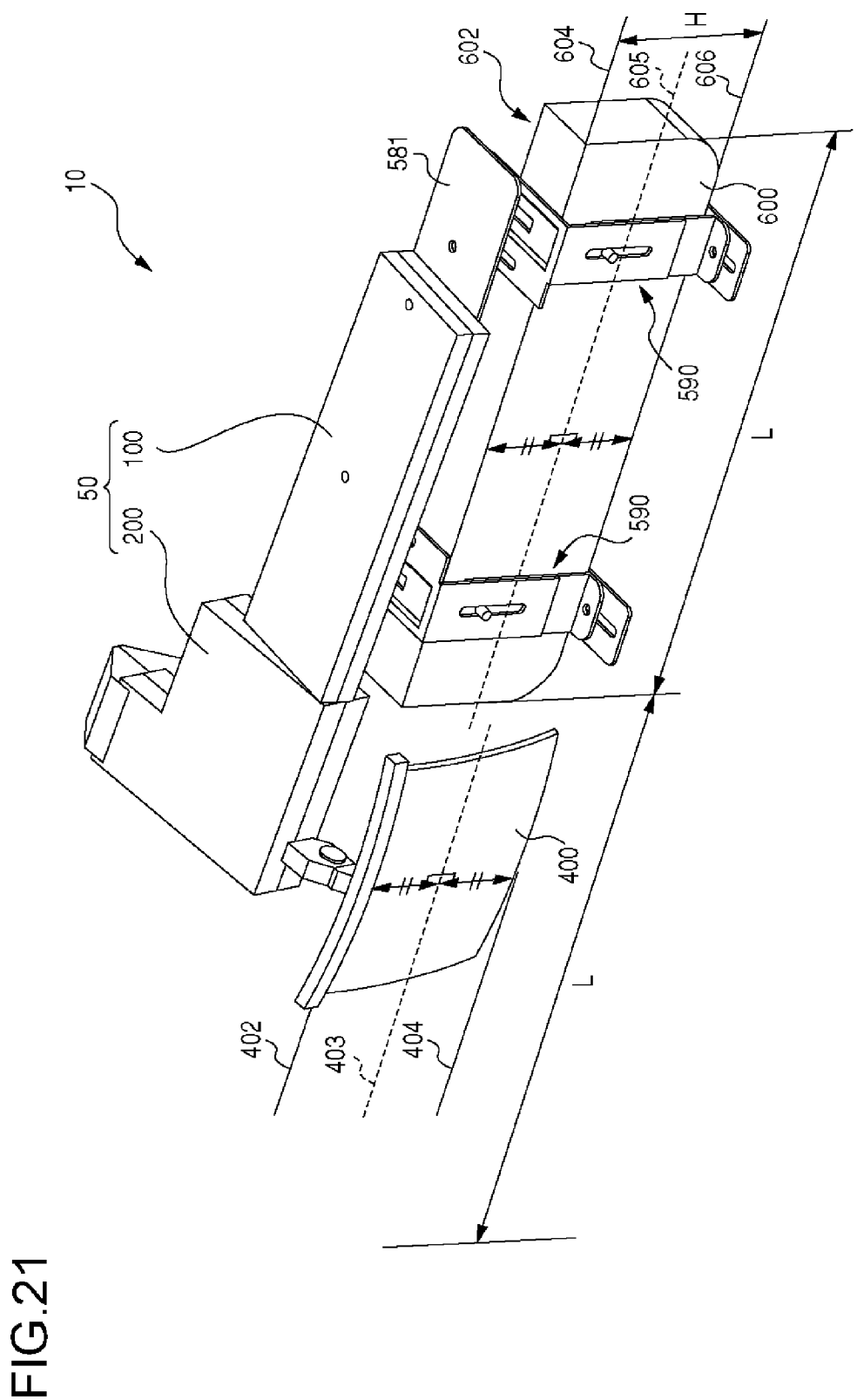
FIG. 21 is a perspective view of a head-up display mounted on a rear-view mirror.

FIG. 21 shows a HUD 10 mounted on the rear-view mirror 600. The holding portions 590 of the attachment member 500 hold tightly an upper end of the rear-view mirror 600 and a lower end thereof from a back side of the rear-view mirror 600 (the back side thereof being the side where no mirror is provided) in two positions. And the projections 584 are fitted into the position adjustment grooves 594 formed on the upper side holding mechanism 592 of the holding portions 590. Thereby, the attachment plate 581 is mounted so that the position thereof in a longitudinal direction of the position adjustment groove 594, mainly in a direction vertical to a mirror surface of the rear-view mirror 600, can be adjusted. Also, the attachment plate 581 is fixed so that the angle, where the normal line of the attachment plate surface of the substrate housing portion 100 serves as the rotational axis, can be adjusted.

A description is now given of a relation between the position of the rear-view mirror 600 and the position of the combiner 400 with reference to FIG. 21. The description thereof is given hereinbelow on the assumption that the longitudinal direction of the rear-view mirror 600 is parallel to horizontal plane and the mirror surface is vertical to the horizontal plane. Also, a line, which passes through a center in the vertical direction of the rear-view mirror 600 and which is parallel to a lateral direction of the rear-view mirror 600, is called a rear-view-mirror central line 605. Also, a line, which passes through a center in the vertical direction of the combiner 400 and which is parallel to a lateral direction of the combiner 400, is called a combiner central line 403.

In the present embodiment, the observation angle of the combiner 400 is adjustable, and the adjustment of the observation angle of the combiner 400 allows a relative height of the combiner 400 to the height of the rear-view mirror 600 to vary. A relative height in between the combiner 400 and the rear-view mirror 600 can be rephrased as a difference in height between the combiner central line 403 and the rear-view-mirror central line 605. If, for example, the combiner central line 403 is in a position higher than that of the rear-view-mirror central line 605, the combiner 400 can be said to be located in a position relatively higher than the rear-view mirror 600.

It is preferable that a positional condition of the combiner 400 explained hereunder be met in all positions of the combiner 400 in a usage state (where an image is projected and the image is visible by the user). In other words, although the positional condition is preferably met in all observation angles that the combiner 400 can possibly form, a sufficient effect can be achieved as long as the positional condition is met when the height thereof is at least an average height of all relative heights to the height of the rear-view mirror 600, which the combiner 400 can possibly be. If, for example, the relative height of the combiner 400 with respect to the height of the rear-view mirror 600 can be adjusted in positions ranging from a height 5 cm higher than the rear-view-mirror central line 605 to a height 5 cm lower than the rear-view-mirror central line 605, the positional condition will be preferably met when the height of the combiner central line 403 is identical to that of the rear-view-mirror central line 605.

Suppose that the relative height of the combiner 400 with respect to the height of the rear-view mirror 600 is fixed with fastening screws or the like so that the relative height thereof cannot be adjusted. Namely, suppose that the HUD 10 is configured such that, when the HUD 10 is mounted on the rear-view mirror 600 of the vehicle, the relative height of the combiner 400 with respect to the height of the rear-view mirror 600 is fixed (the height thereof is uniquely determined). Then, in the fixed position, the positional condition (described below) of the combiner 400 is preferably met.

Also, as shown in FIG. 21, the rear-view mirror 600 has a length L in the lateral direction (the longitudinal direction) and a height H in the vertical direction.

A description is first given of a preferred positional condition of the combiner 400. In the present embodiment, the combiner 400 is configured such that an upper end 402 of the combiner 400 in the usage state is above the rear-view-mirror central line 605 of the rear-view mirror 600 and such that a lower end 606 of the combiner 400 in the usage state is below the rear-view-mirror central line 605 thereof. The HUD 10 is mounted on the rear-view mirror 600, and the combiner 400 is configured such that the combiner 400 is mounted in such a position as this. This configuration and arrangement enable the HUD 10 to be installed in the optimal position where the eye movement is reduced when the driver looks at the displayed image.

Further, the combiner 400 may be configured such that the height of the combiner central line 403 of the combiner 400 in the usage state is almost identical to that of the rear-view-mirror central line 605. The HUD 10 is mounted on the rear-view mirror 600, and the combiner 400 is configured such that the combiner 400 is mounted in such a position as this. This configuration and arrangement enable the HUD 10 to be installed in the optimal position where the eye movement is further reduced when the driver looks at the displayed image.

Consider a case where the height of the combiner 400 in the vertical direction is larger than the height H in the vertical direction. Then, the combiner 400 may be configured such that the upper end 402 of the combiner 400 in the usage state is above an upper end 604 of the rear-view mirror 600 and such that the lower end 606 of the combiner 400 in the usage state is below a lower end 606 thereof. The HUD 10 is mounted on the rear-view mirror 600, and the combiner 400 is configured such that the combiner 400 is mounted in such a position as this. This configuration and arrangement enable the HUD 10 to be installed in the optimal position where the eye movement is further reduced when the driver looks at the displayed image.

The positions set as above according to the present embodiment are the optimal setting. However, the HUD 10 can be also installed in preferable positions where the eye movement is reduced when the driver looks at the displayed image, as long as at least the combiner 400 is configured as follows. That is, the combiner 400 is configured such that the upper end 402 of the combiner 400 in the usage state is above the lower end 606 of rear-view mirror 600 or such that the lower end 606 of the combiner 400 in the usage state is below the upper end 604 of the rear-view mirror 600. In the present embodiment, the state where the combiner 400 is located lateral to the rear-view mirror 600 means as follows. That is, this state is preferably such that the conditions under which the above described effects can be achieved is met and such that a lateral position of the combiner 400 is a position where the displayed image is visible from the seats of the vehicle. In other words, the lateral position of the combiner 400 is the position where the displayed image projected onto the combiner 400 is not blocked by the rear-view mirror 600.

In addition to the above-described positional conditions, the lateral position of the combiner 400 may be arranged within such a range starting from a lateral end (side edge) of the rear-view mirror 600 and extending sideward therefrom by the length L of the rear-view mirror 600. Thereby, the combiner 400 is located not too far from the rear-view mirror 600 and therefore the eye movement is further reduced, which is more preferable.

Figure 22:
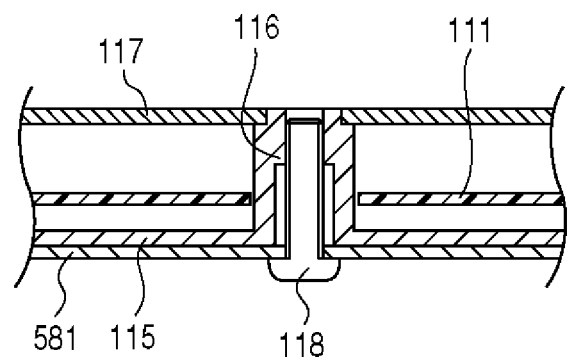
FIG. 22 is a cross-sectional view of a setscrew portion when a first attachment surface of a substrate housing portion is so mounted as to come in contact with a attachment plate.
Figure 23:
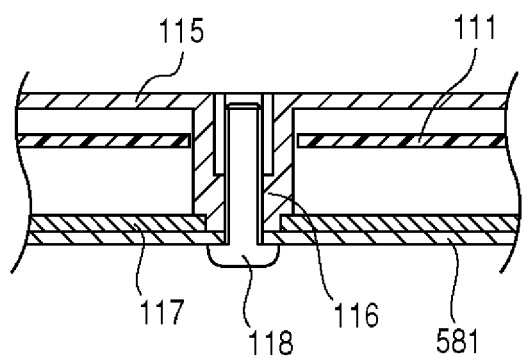
FIG. 23 is a cross-sectional view of a setscrew portion when a second attachment surface of a substrate housing portion is so mounted as to come in contact with a attachment plate.

FIG. 22 is a cross-sectional view of a setscrew 118 portion when the first attachment surface 115 of the substrate housing portion 100 is so mounted as to come in contact with the attachment plate 581. FIG. 23 is a cross-sectional view of the setscrew 118 portion when the second attachment surface 117 of the substrate housing portion 100 is so mounted as to come in contact with the attachment plate 581. A space between the upper side of the rear-view mirror 600 and the ceiling of the vehicle is generally very narrow. Thus, when the first attachment surface 115 comes in contact with the attachment plate 581 or when the second attachment surface 117 comes in contact with the attachment plate 581, the setscrew 118 can be fastened from below only. Also, an insert nut 116, which is a fixed member engagement portion and which extends to the second attachment surface 117, is formed in the first attachment surface 115. And a through-hole is formed in a position corresponding to the second attachment surface 117. Thus, when the first attachment surface 115 comes in contact with the attachment plate 581 or when the second attachment surface 117 comes in contact with the attachment plate 581, the setscrew 118 is engaged with the same insert nut 116 so as to be secured. Thus, the substrate housing portion 100 can be installed even though the space available between the upper side of the rear-view mirror 600 of the vehicle and the ceiling thereof is limited and narrow. Hence, in the HUD 10 according to the present embodiment, the position and the angle thereof can be adjusted in a space saving manner.

Figure 24:
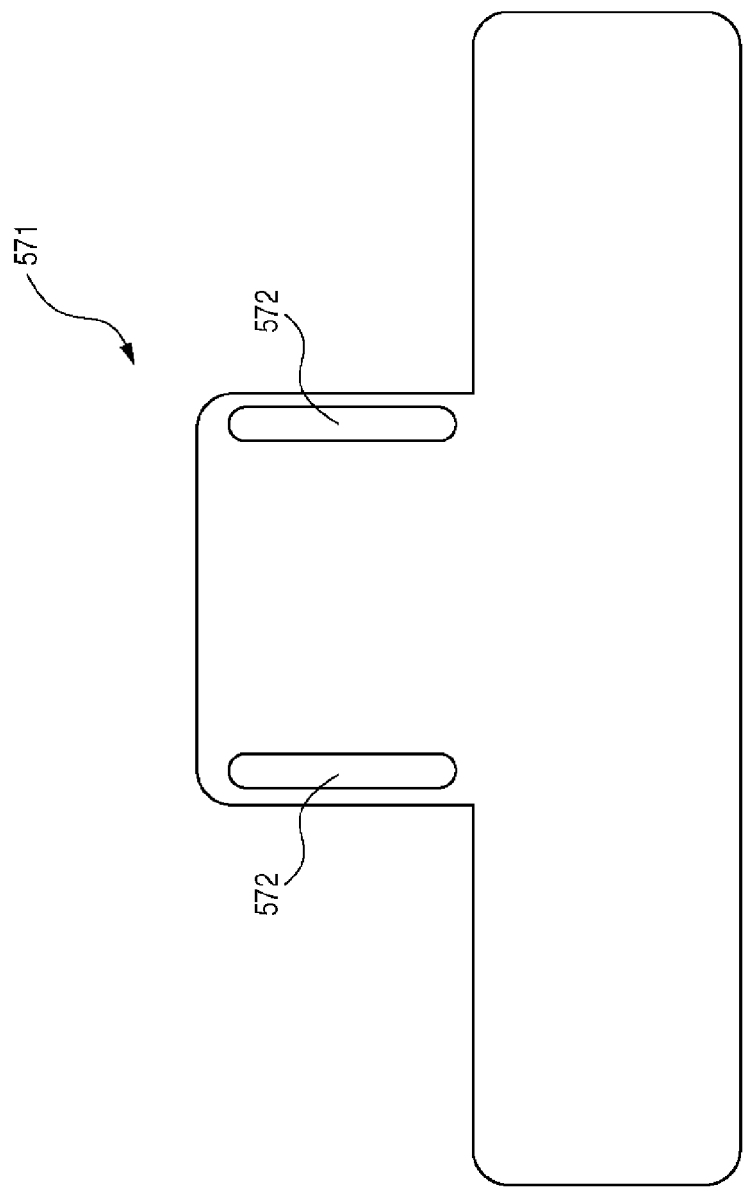
FIG. 24 shows a modification of attachment plate.

FIG. 24 shows an attachment plate 571 that is a modification of the attachment plate 581. The attachment plate 571 has a pair of linear holes 572, which extend in the same direction and which are used in mounting the substrate housing portion 100. Even when either one of the first attachment surface 115 and the second attachment surface 117 of the substrate housing portion 100 faces the attachment plate 571, the setscrews 118 are inserted into the both linear holes 572 and secured. When the substrate housing portion 100 is to be mounted, the attachment plate 571 is mounted such that the mounting positions, of both of the pair of linear holes 572, in the longitudinal direction are changed, so that the position of the substrate housing portion 100 with respect to the linear holes 572 in the longitudinal direction can be adjusted. Here, the width of each of the linear holes 572 is formed in size sufficiently larger than the screw diameter of the setscrew 118. Thus, if the mounting position, of one of the pair of linear holes 572, in the longitudinal direction is changed, the direction where the normal line of the surface of the attachment plate 581 of the substrate housing portion 100 serves as the rotation axis can be adjusted. The length and width of the linear hole 572 is determined within such a range that the combiner 400 does come in contact with the windshield.

A pair of long holes, each of which is of an arc shape, are formed in the attachment plate 581 described earlier. In contrast, the attachment plate 571 according to this modification has a pair of long holes each of which is linear in shape. By employing this modification, too, the direction of the substrate housing portion 100 can be freely adjusted. In the embodiments described as above in conjunction with FIG. 19 to FIG. 24 are examples where the substrate housing portion 100 and the optical unit 200 are configured as separate bodies. However, the present embodiments are applicable to an example where the substrate housing portion 100 and the optical unit 200 are configured as not the separate bodies (FIG. 21). Also, in the embodiments described as above in conjunction with FIG. 19 to FIG. 24, there are two position adjustment grooves 594 but this should not be considered as limiting; for example, it suffices if there is at least one groove having a function of adjusting the position.

[Combiner Storage]

Figure 25:
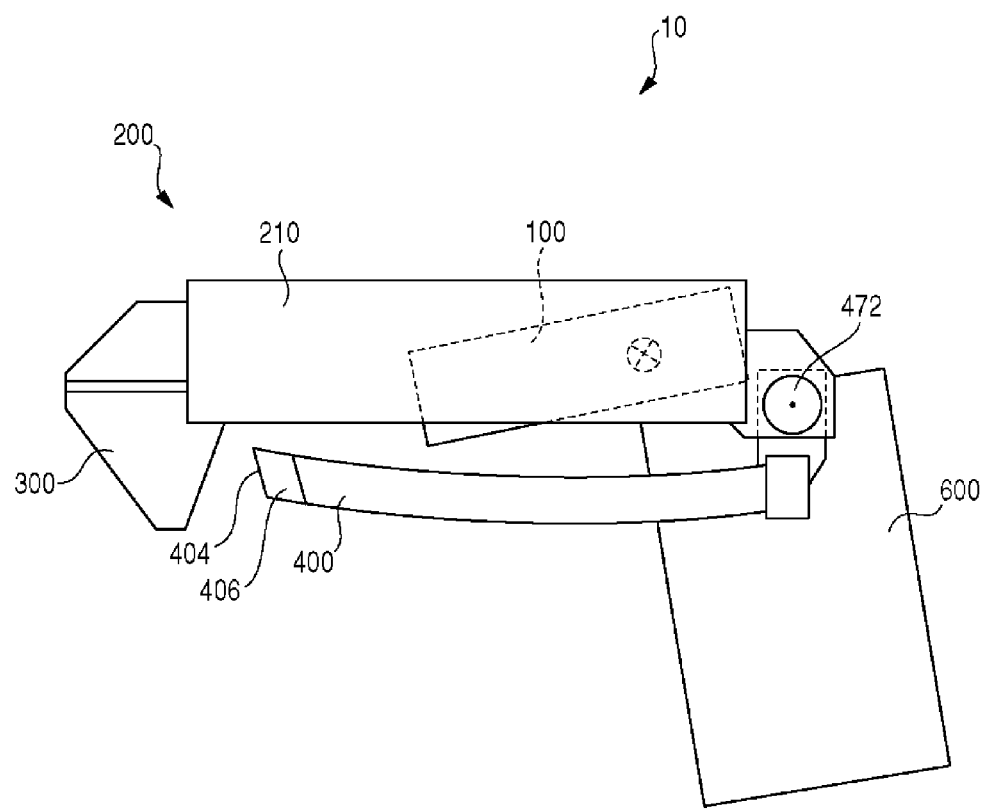
FIG. 25 is a side view showing how a combiner has been bent by a storage hinge.
Figure 26:
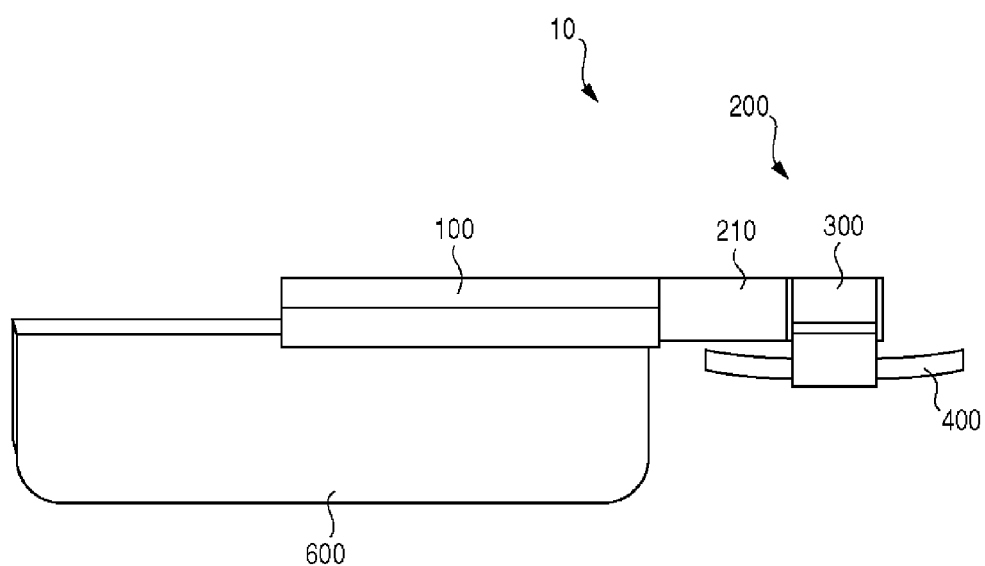
FIG. 26 is a front view showing how a combiner has been bent by a storage hinge.

FIG. 25 and FIG. 26 are a side view and a front view respectively showing how the combiner 400 is in a storage position by a storage hinge 472. As shown in FIG. 25 and FIG. 26, the combiner 400 is stored by the storage hinge 472, which is a turning portion of the combiner 400, in the following manner. That is, the combiner 400 faces a casing surface of the optical unit 200, namely faces the casing surface of the optical unit main body 210; for example, the combiner 400 is turned such that the combiner 400 is placed over the casing surface thereof. Here, the projection unit 300 is on a side opposite to a side on which the combiner 400 is mounted; that is, the projection unit 300 is on the side opposite thereto with the casing surface thereof located between the projection unit 300 and the combiner 400. More specifically, the length up to the lower end 606 of the combiner 400, which is an end thereof farthest from a turning center of the storage hinge 472, is shorter than the length of the optical unit main body 210, and the lower end 606 thereof is on a storage hinge 472 side than the projection unit 300. Also, the height of the optical unit main body 210 from the casing surface is lower than the height of the projection unit 300 from the casing surface. Accordingly, when the HUD 10 is not in use, the combiner 400 is stored in a storage position by the storage hinge 472. Thereby, the combiner 400 can be placed in a position where the sense of being oppressed on the driver is minimized or eliminated, as compared with when the combiner 400 is in use. Here, the position where the sense being oppressed on the driver is minimized or eliminated corresponds to a position where the combiner 400 is less likely to come into sight of the driver than when the combiner is in use. Also, since the combiner 400 is stored by turning the storage hinge 472, the sunlight can be prevented by the ceiling of the vehicle and the optical unit main body 210 and therefore the degradation of the combiner 400 can be prevented. Further, the storage hinge 472 stops at an angle formed when the combiner 400 was previously in use. Thus, when the user starts again to use the combiner 400 after the combiner 400 had been stored by turning the storage hinge 472, the driver can smoothly start to use the combiner 400 without the trouble of adjusting the position thereof again. In a modification, a transparent rubber 406 may be mounted at a corner on a lower end 606 side of the combiner 400. Suppose that the combiner 400 is stored by the storage hinge 472 while the user pinches the rubber 406. Then this can prevent dirt and the like from sticking to the combiner 400. Since the rubber 406 is transparent, provision of the rubber 406 rarely blocks the driver's visual field.

In the above-described embodiments, the HUD 10 is mounted from the back surface side of the rear-view mirror 600. Instead, the HUD 10 may be mounted on a supporting post of the rear-view mirror 600 or may be mounted from a front surface side of the rear-view mirror 600, namely from the mirror surface 602. In such a case, a substitute mirror may be placed on a surface of the HUD 10 in a position thereof corresponding to the mirror surface 602

Also, in the above-described embodiments, the rear-view mirror 600 is not limited to any particular mirror as long as it is used to verify the rear area of the vehicle, and the position and the like of the mirror in the vehicle's passenger compartment are not restricted to any particular ones. Also, although, in the above-described embodiments, the HUD 10 is mounted to the rear-view mirror 600, the HUD 10 may be used by placing it on the dashboard. Also, a liquid display device or an organic electroluminescent (EL) display device may be placed in the position of the combiner 400 so as to function as a HUD.

What is claimed is:

1. A display apparatus for a vehicle comprising:
   a substrate housing portion that contains a circuit substrate for outputting an image signal of an image to be displaced;
   an optical unit that generates an image based on the image signal outputted from the circuit substrate, the optical unit including a projection unit that projects the generated image by light emitted from a light source;
   a combiner onto which the image is projected, the combiner being provided at one end of the optical unit;
   a turning member that connects the optical unit to the substrate housing portion in a freely rotatable manner; and
   a plate-like attachment plate with which to mount the substrate housing portion to a rear-view mirror such that the optical unit is freely rotatable by the turning member without coming into contact with the rear-view mirror inside a vehicle.

2. The display apparatus for a vehicle according to claim 1, wherein the substrate housing portion has a first attachment surface and a second attachment surface disposed counter to the first attachment surface, and
   wherein the optical unit is freely rotatable without coming into contact with the rear-view mirror, regardless of whether the first attachment surface of the substrate housing portion is mounted on the attachment plate or the second attachment surface thereof is mounted on the attachment plate.

3. The display apparatus for a vehicle according to claim 1, further comprising a rotation lock mechanism that controls a rotatable range such that the turning member turns within a predetermined range of angles.

4. The display apparatus for a vehicle according to claim 1, wherein the rotating of the turning member changes a position where an image displayed as a virtual image by the combiner is recognized.

5. The display apparatus for a vehicle according to claim 1, wherein the optical unit includes an optical portion that generates an image based on the image signal outputted from the circuit substrate and projects an image display light of the generated image, and
   wherein, when the substrate housing portion is mounted to the rear-view mirror by using the attachment plate, the optical portion is designed on such a basis that an angle formed between a reference surface of the optical unit and a mirror surface of the rear-view mirror is a reference angle.

6. The display apparatus for a vehicle according to claim 5, wherein the reference surface of the optical unit is a plane parallel to a plane including an optical axis inside the optical unit.

7. The display apparatus for a vehicle according to claim 1, further comprising a pair of holding portions that are so fixed as to hold the rear-view mirror,
   wherein each of the pair of holding portions has a long-hole position adjustment groove on an upper surface thereof,
   wherein the attachment plate has a pair of projections,
      the attachment plate is placed in such a manner as to lie across the respective upper surfaces of the pair of holding portions, and
      the substrate housing portion and the optical unit are mounted such that the pair of projections are engaged respectively with the pair of position adjustment grooves of the pair of holding portions, and wherein the attachment plate slides along a longitudinal direction of the position adjustment groove so that positions of the substrate housing portion and the optical unit are adjustable.

8. The display apparatus for a vehicle according to claim 1, further comprising a wiring through which the image signal is supplied from the circuit substrate of the substrate housing portion to the optical unit, the substrate housing portion having an optical unit side opening through which the wiring provided in a casing is permitted to pass, and the optical unit including:
  an optical unit side opening through which the wiring provided in the casing is permitted to pass;
  a space where the wiring is movable when the optical unit turns relative to the optical unit;
  a heatsink that radiates heat generated by the light source; and
  an optical system placement unit that houses optical components including the light source, wherein the space and the heatsink are placed on a substrate housing portion side of the optical system placement unit.

9. The display apparatus for a vehicle according to claim 1, further comprising a turning portion that moves the combiner to a first position, where the combiner is in use, and a second position, where the combiner is stored, the second position being such that a projection surface of the combiner faces a casing surface of the optical unit, wherein the optical unit has the projection unit on a first side opposite to a second side, where the combiner is mounted, with the casing surface located between the first side and the second side, wherein the projection unit is of a shape such that the projection unit protrudes from a plane formed by the casing surface, and wherein, when the combiner is moved, by the turning portion, to the second position of the combiner where the combiner is stored, an end of the combiner farthest from a turning center of the turning portion is on a turning portion side than the projection unit.

* * * * *